Figure 6:
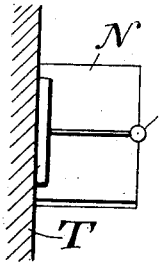

J. BECKER.
FOCUSING CAMERA.
APPLICATION FILED AUG. 11, 1900.
1,178,474.
Patented Apr. 4, 1916.
20 SHEETS—SHEET 1.
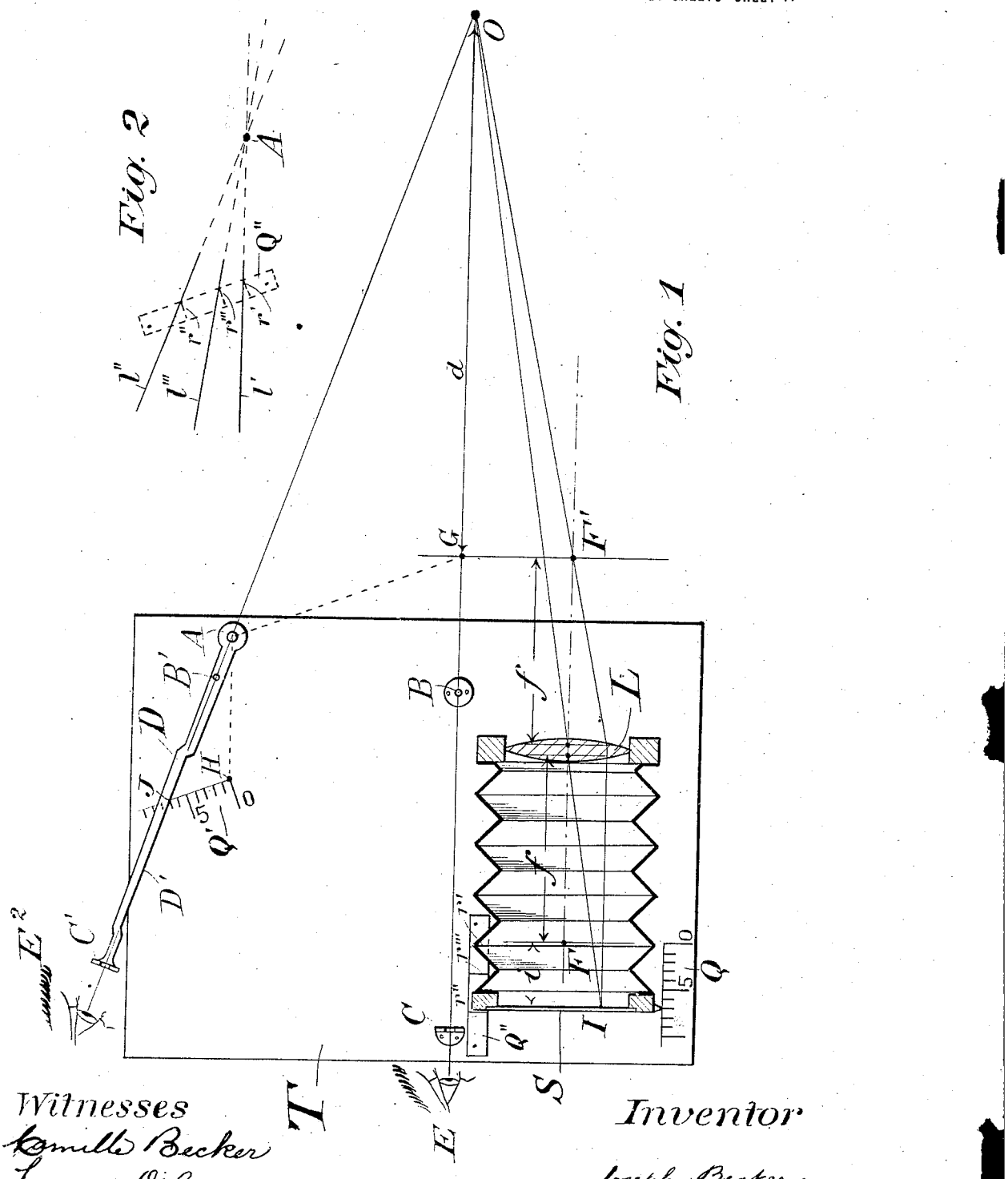
Witnesses
Camille Becker
Louise Dufon
Inventor
Joseph Becker

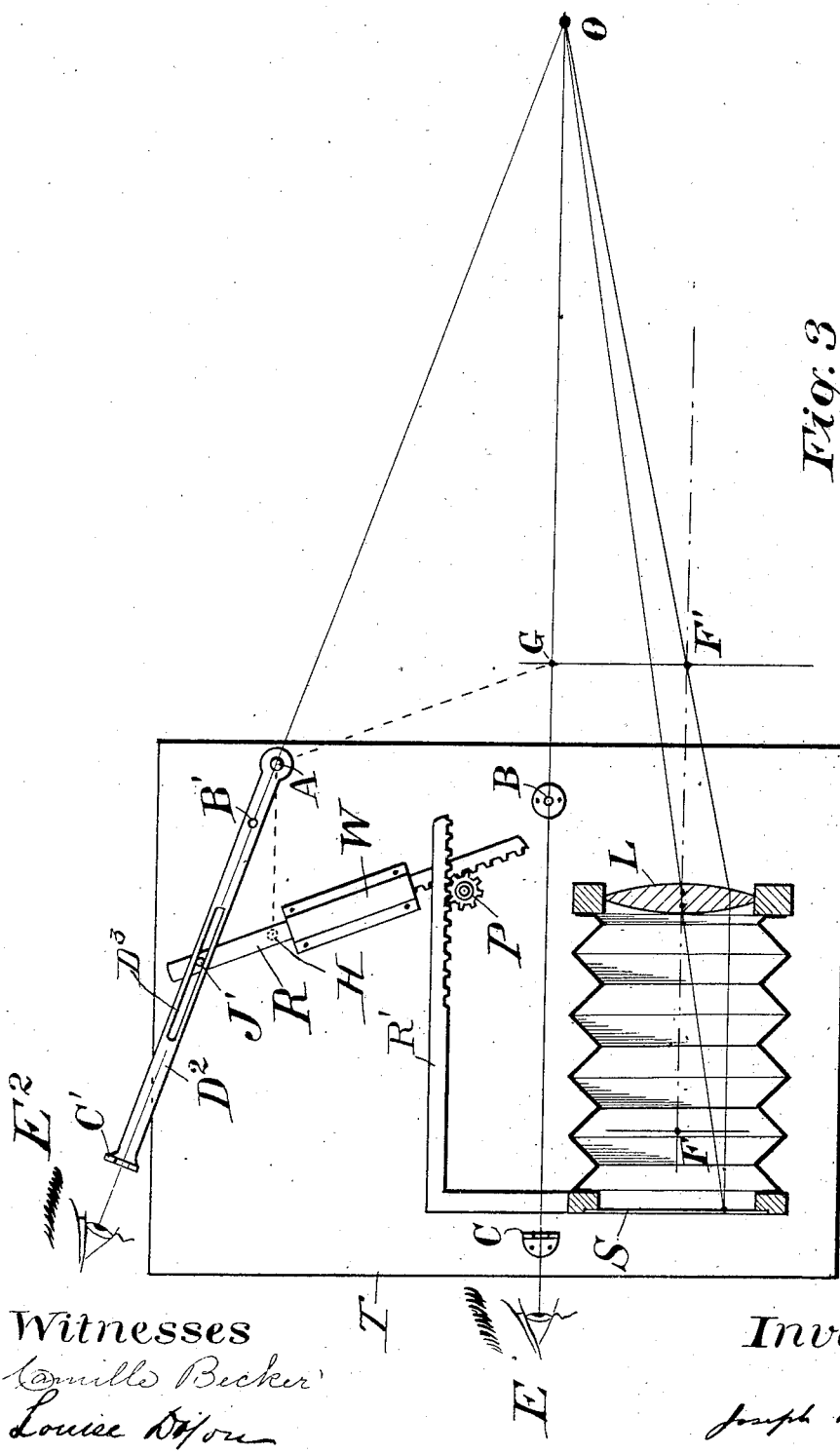

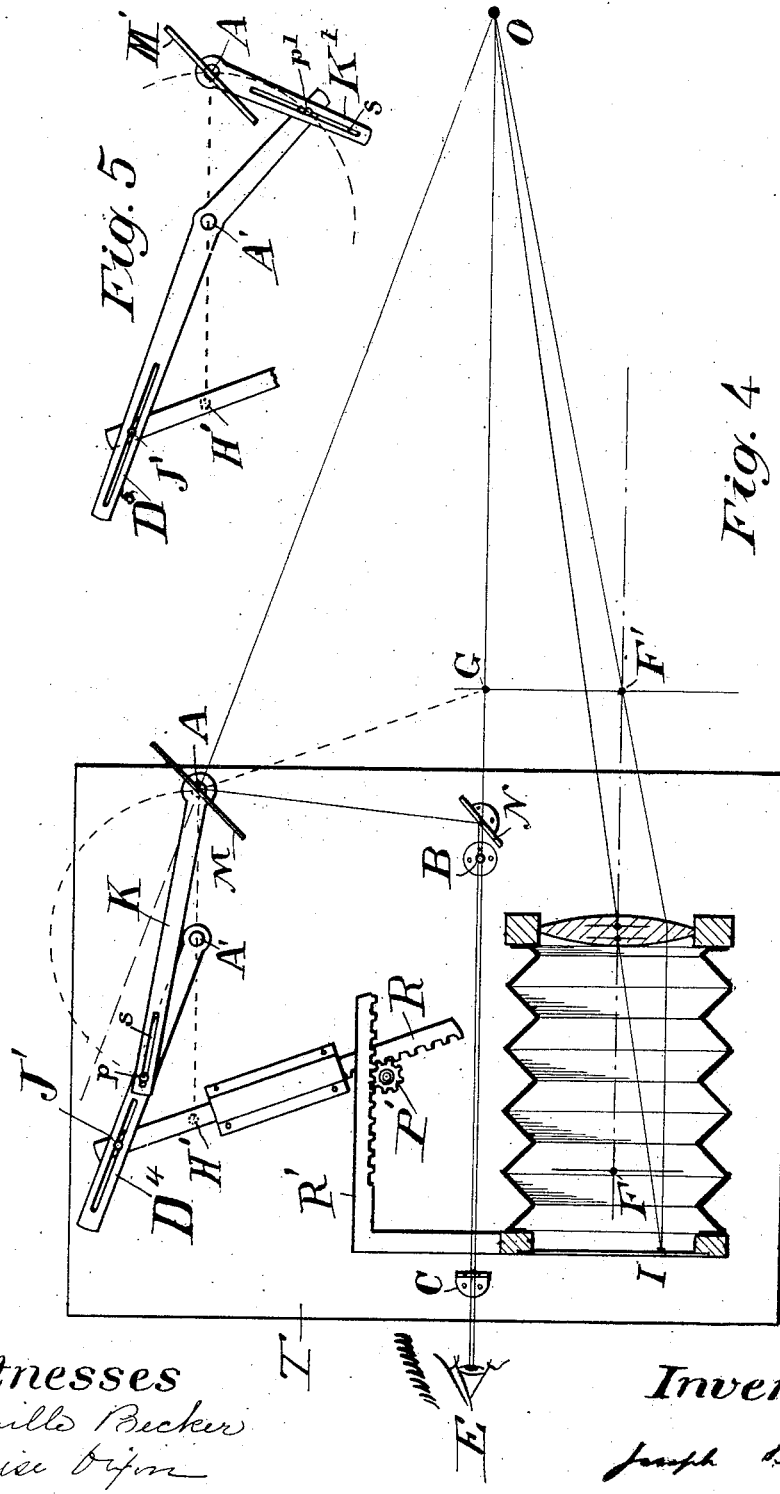

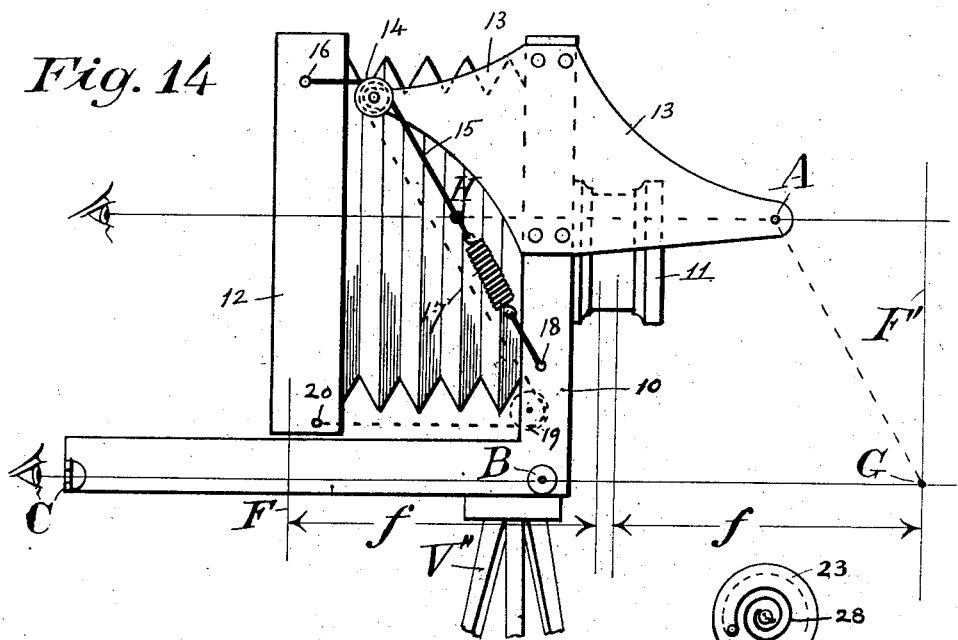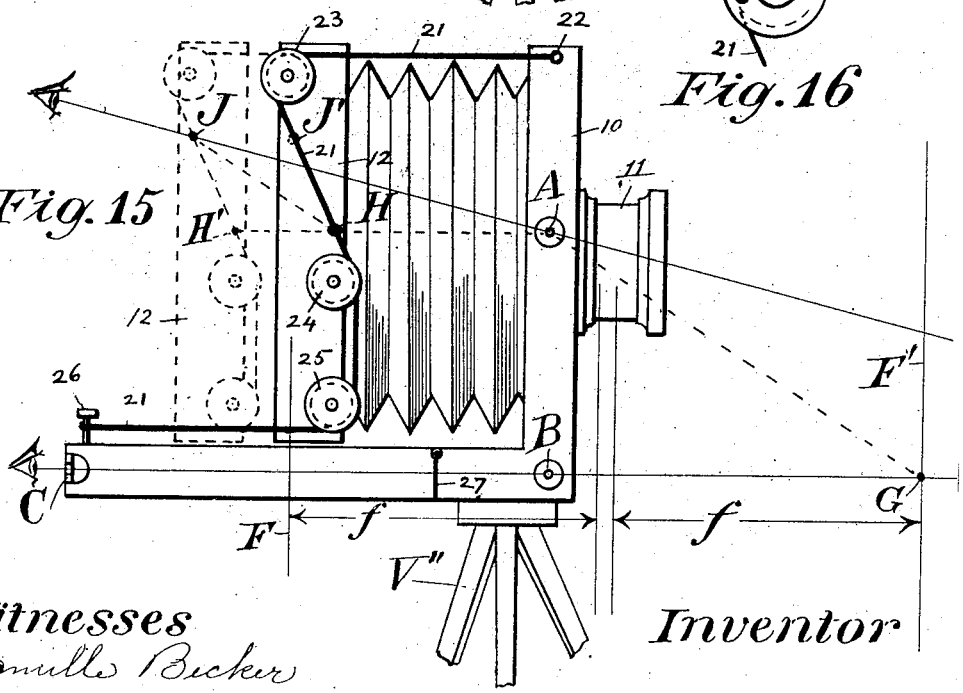

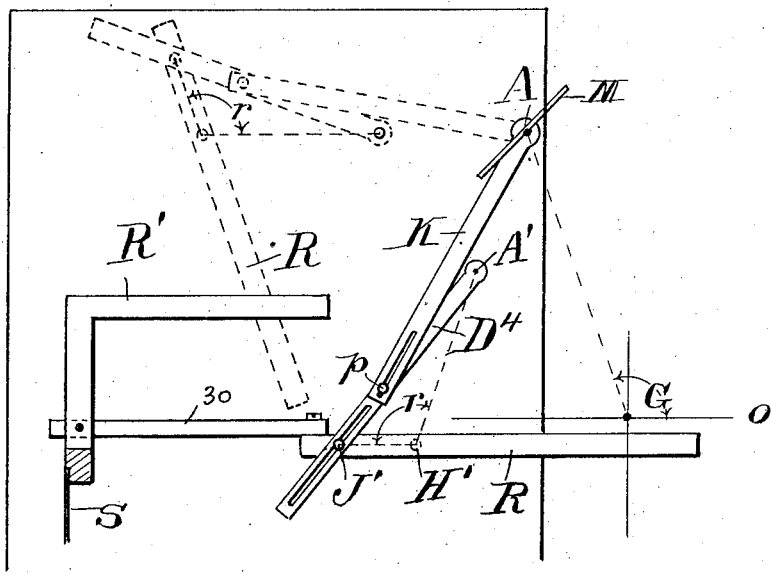
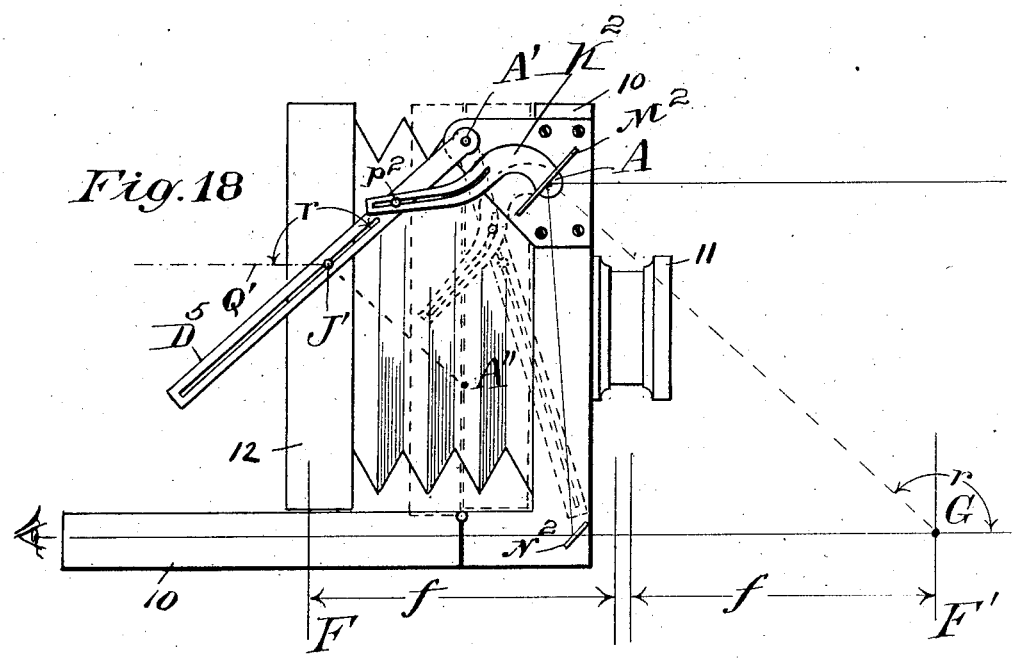

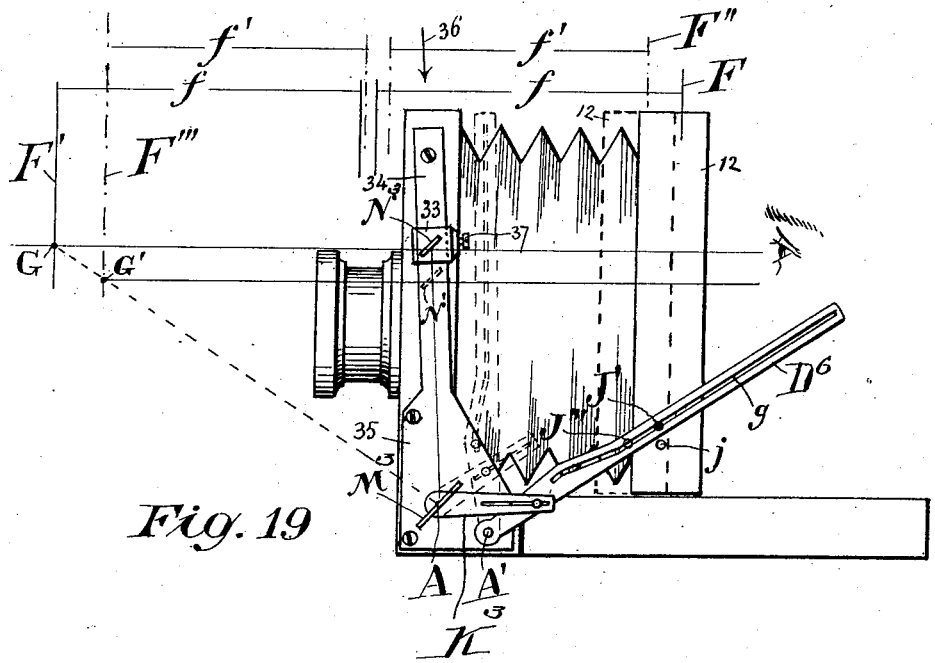
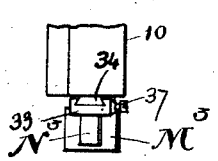
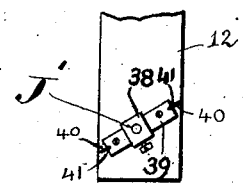
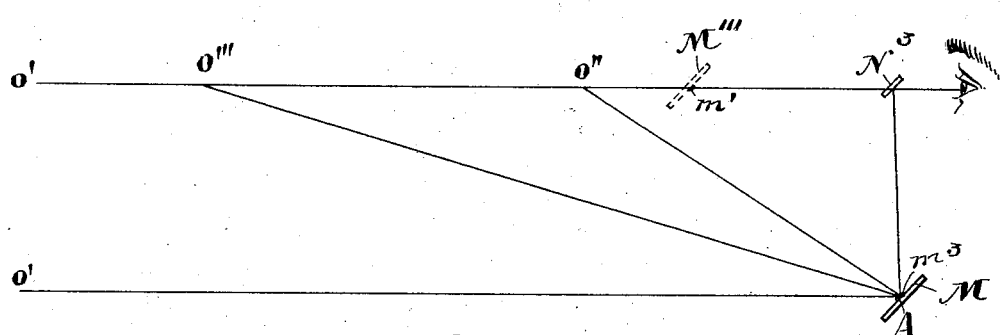

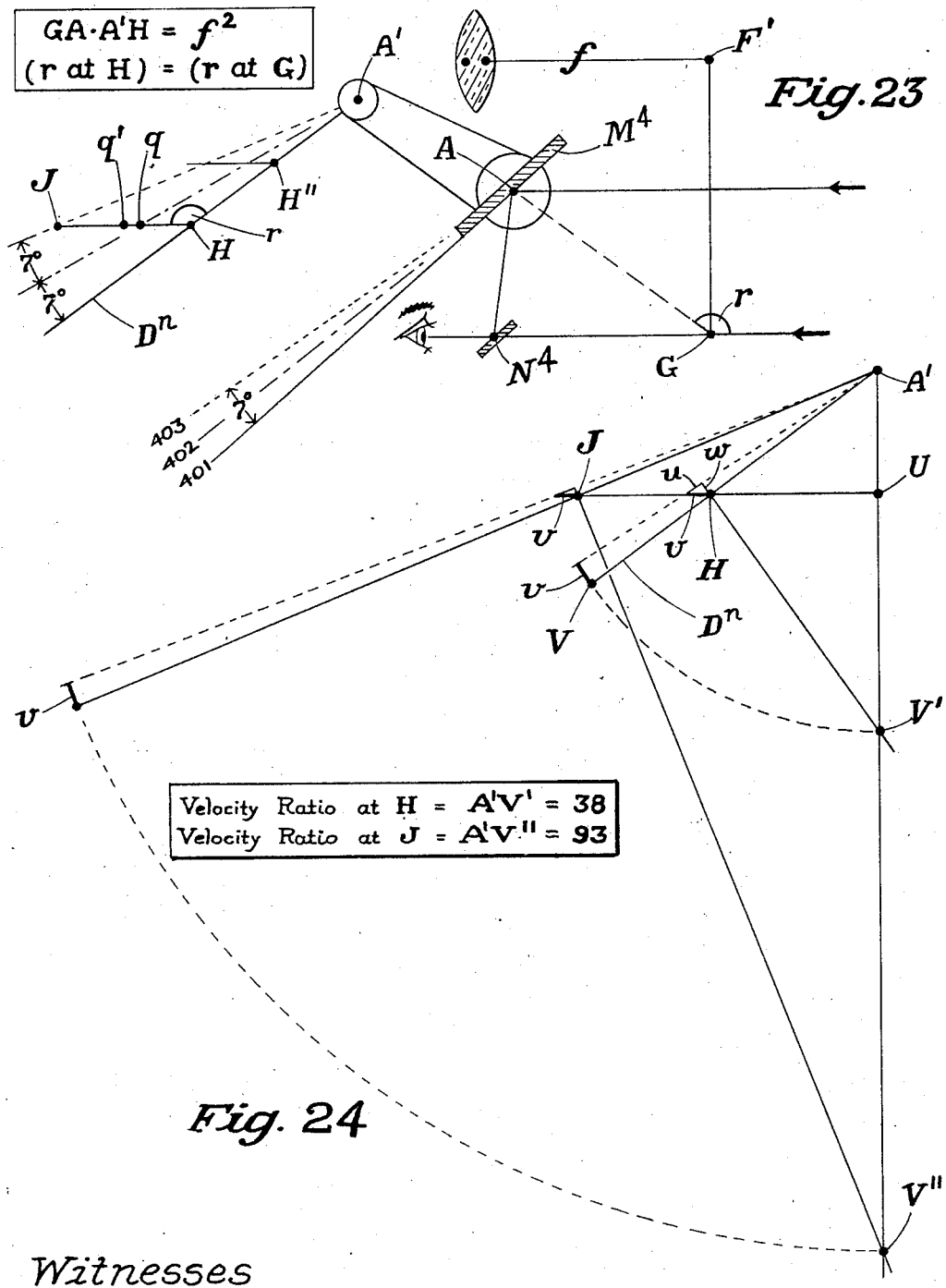

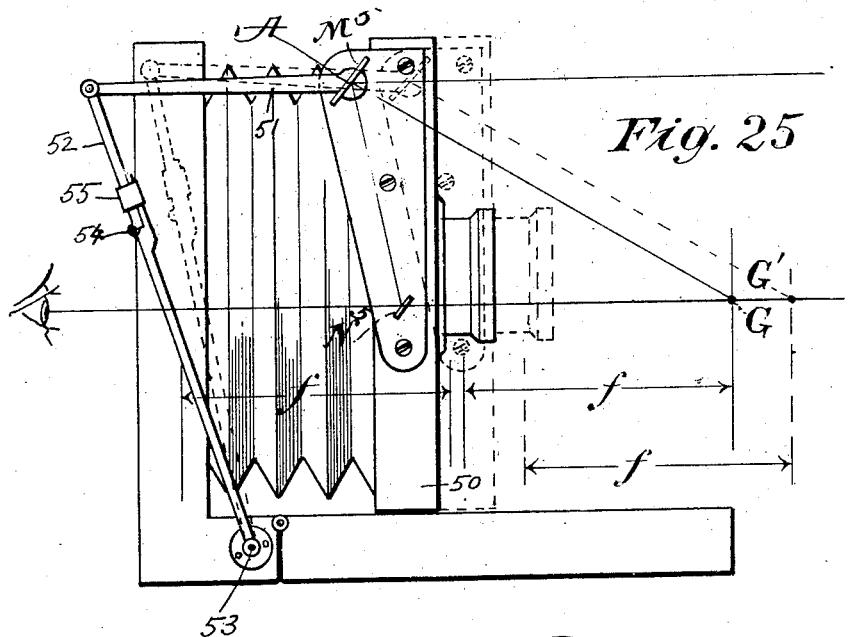
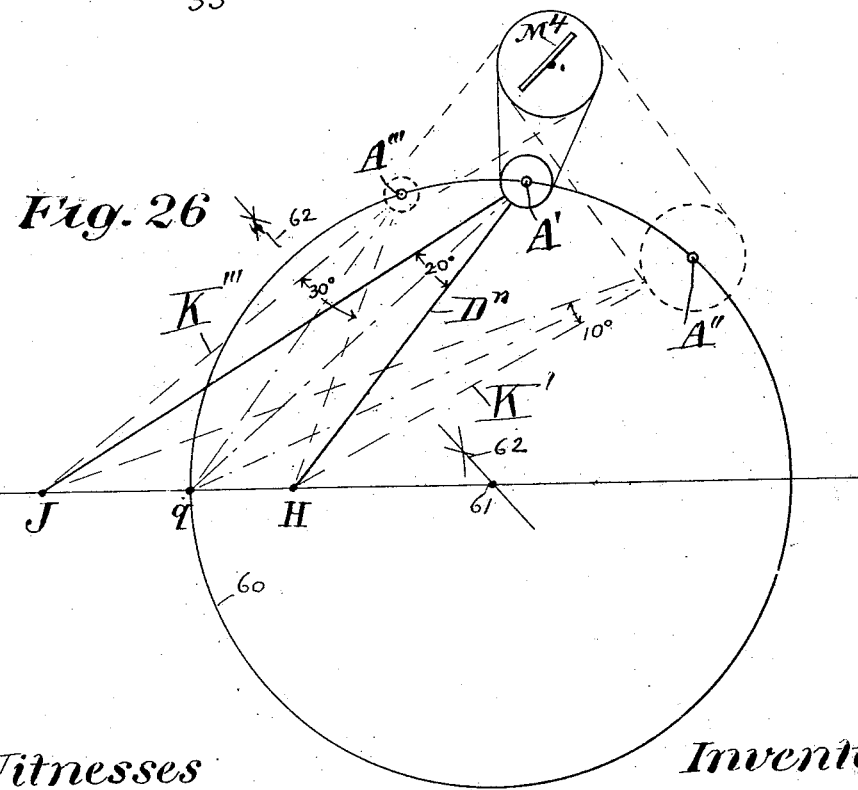

J. BECKER.
FOCUSING CAMERA.
APPLICATION FILED AUG. 11, 1900.

1,178,474.

Patented Apr. 4, 1916.
20 SHEETS—SHEET 14.

Witnesses
Camillo Becker
Louie Dupin

Inventor
Joseph Becker

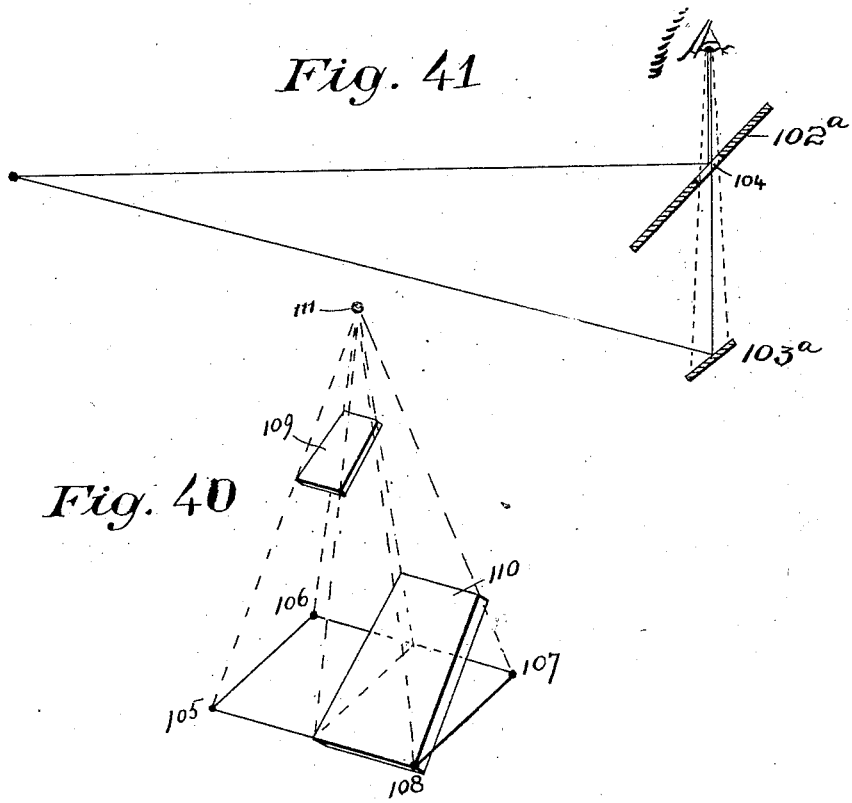
Fig. 41
Fig. 40
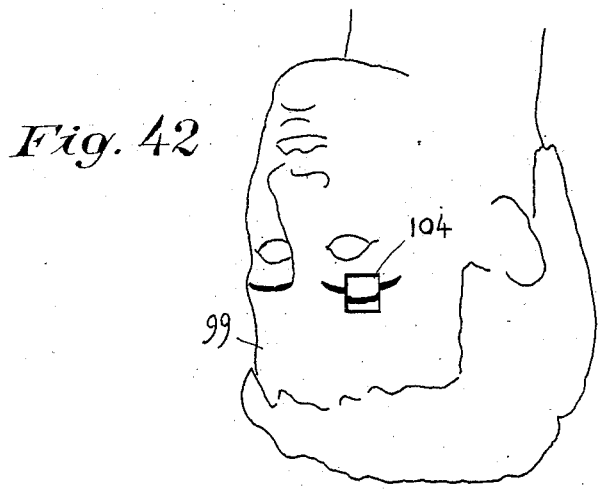
Fig. 42
Witnesses
Inventor

J. BECKER.
FOCUSING CAMERA.
APPLICATION FILED AUG. 11, 1900.
1,178,474.
Patented Apr. 4, 1916.
20 SHEETS—SHEET 16.
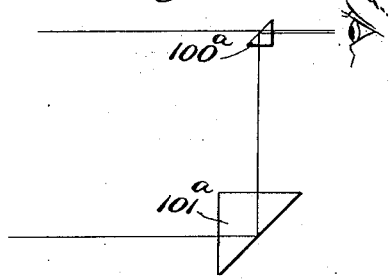
Fig. 43
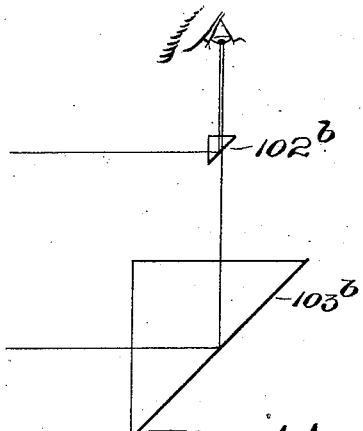
Fig. 44
Fig. 47
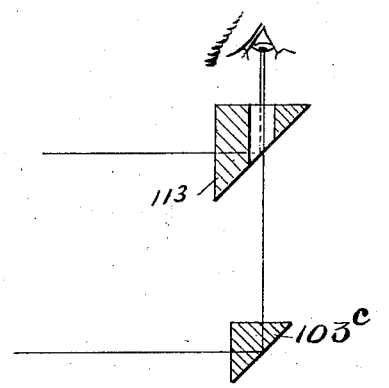
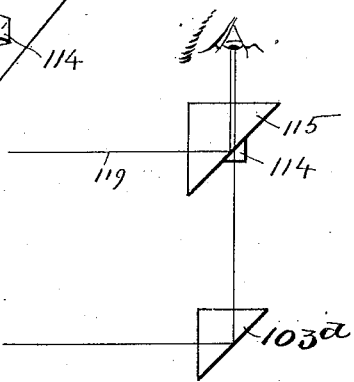
Fig. 45
Fig. 46
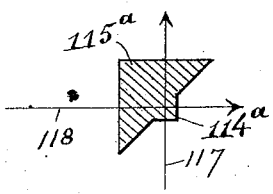
Fig. 48
Witnesses
Camille Becker
Louise Dixon
Inventor
Joseph Becker

J. BECKER.
FOCUSING CAMERA.
APPLICATION FILED AUG. 11, 1900.

1,178,474.

Patented Apr. 4, 1916.
20 SHEETS—SHEET 17.

Witnesses
Camille Becker
Emma Becker

Inventor
Joseph Becker

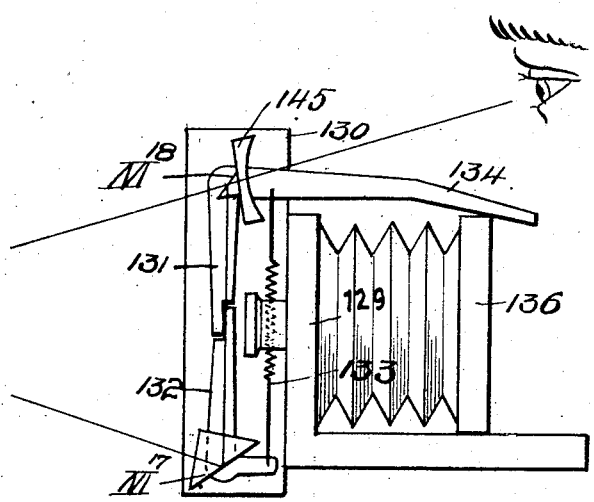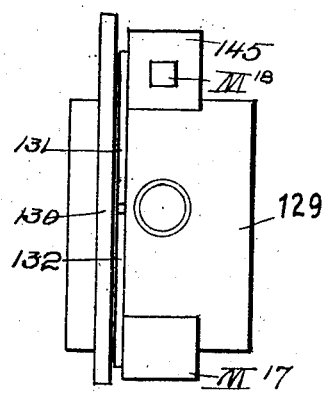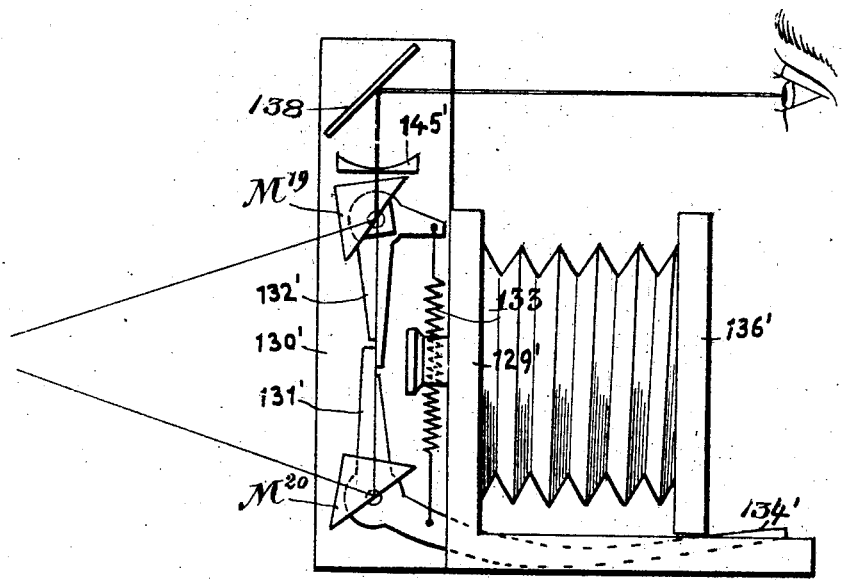

J. BECKER.
FOCUSING CAMERA.
APPLICATION FILED AUG. 11, 1900.

1,178,474.

Patented Apr. 4, 1916.
20 SHEETS—SHEET 19.

Witnesses

Inventor
Joseph Becker

UNITED STATES PATENT OFFICE.

JOSEPH BECKER, OF WASHINGTON, DISTRICT OF COLUMBIA.

FOCUSING-CAMERA.

1,178,474.      Specification of Letters Patent.      Patented Apr. 4, 1916.

Application filed August 11, 1900. Serial No 26,647.

*To all whom it may concern:*

Be it known that I, JOSEPH BECKER, a citizen of the United States, residing at Washington, District of Columbia, have invented a new and useful Focusing-Camera, of which the following is a specification.

The present patent application is identified for convenience of reference in my related applications or patents as Case A. This Case A is fundamental, in that its principles bear more or less directly on all of the focusing devices described in my later applications or patents as follows: Case B, Serial No. 42,957, filed January 12, 1901; Case C, Serial No. 63,106, filed June 4, 1901; Case D, Serial No. 64,722, filed June 15, 1901; Case F, Serial No. 67,469, filed July 8, 1901; Case I, Serial No. 211,452, filed June 7, 1904; Case J, Serial No. 246,169, filed February 17, 1905; Case K, now Patent 1,103,342, issued July 14, 1914; Case L¹, now Patent 1,126,352, issued January 26, 1915; Case O, now Patent 1,103,343, issued July 14, 1914; Case T, now Patent 1,142,295, issued June 8, 1915; Case U, Serial No. 659,021, filed November 7, 1911; Case V, now Patent 1,126,353, issued January 26, 1915; Case W, Serial No. 696,197, filed May 9, 1912; Case X, Serial No. 727,548, filed October 24, 1912; Case Y, Serial No. 732,488, filed November 20, 1912; Case Aa, now Patent 1,136,761, issued April 20, 1915; Case Ab, Serial No. 820,695, filed February 24, 1914; Case Ad, Serial No. 14,178, filed March 13, 1915; Case Ae, Serial No. 66,371, filed December 11, 1915; Case Af, Serial No. 76,423, filed February 5, 1916.

My invention relates to all classes of focusing cameras; that is, to any camera containing one or more movable parts the motions of which are adapted to produce variations in the depth of the camera or distance from the image receiving surface to the nodal point of emergence of the camera lens or objective. I shall use the term "focusing camera" in the sense here defined, throughout this specification and in the claims.

The main object of my invention is to do away with focusing by measurement or estimation or distances, and with the troublesome, imperfect and purely tentative process of focusing with a ground glass, an operation which requires a certain time, much light in the object, a very clear vision and considerable practice, and which some people never can succeed in mastering.

By means of my invention it is possible to focus with scientific accuracy even while the sensitive plate is in its place in the camera, and with my most improved mirror forms the operation is so easy and rapid that the plate or film may be exposed at any desired and the most propitious instant.

My invention consists broadly in any means for sighting from two different points of a camera, on one same object point to be photographed, and in mechanically connecting elements of the sighting means with the elements of the camera, so that to each angular relation of the elements of the sighting means shall correspond a certain depth of the camera, the correspondence being such that the sensitized surface of the camera shall exactly contain the conjugate focus of the object point sighted, for at least two differently distant object points.

The sighting means alone as a removable camera attachment is fully shown and claimed in my said Case B and in my said Case F.

The mere act of sighting automatically focuses and will keep in focus an object moving in any direction with respect to the camera, and hence my invention finds an important application in the taking of moving pictures where it is so desirable to keep a sharp focus on the principal moving object. So little light is required that by its means a camera may be focused in a room lighted by ordinary gas light. This is important in all cases and is especially so for operators having defective vision. It is also most useful in flash light photography.

My invention also consists in means that compensate for errors of parallax and of means which define the limits of the image, such latter corresponding in purpose to what is usually known as a finder, and being so combined with the focuser that the observer's eye without displacement may see the limits of his picture and may sight, that is to say—automatically focus at one and the same time.

My invention may be applied to any camera having means for changing its depth, depth being, as before stated, the distance of the nodal point of emergence of the camera lens or objective from the inside image receiving surface of the camera. Cameras of fixed depth, usually called "fixed focus cameras," have a limited range of usefulness which is expressed by saying that they cannot be used on objects closer than a certain distance. This distance is different for the different cameras and increases rapidly with the quality, focal length and opening of the objective. My device, therefore, is most useful in connection with the sharp expensive lenses of modern make; and especially so when it is desired to use them with full aperture for instantaneous work, as they then have little depth of focus, and badly blur everything before and beyond a certain plane. This plane, with my device, can easily be made to pass through the principal object of the picture so the blurring shall fall on the secondary objects, and serve to enhance the artistic effect.

By means of my invention it is not necessary at any time to examine the image produced by the lens in the camera and hence there is no necessity in my improved camera for making the visual focus of the lens coincide with its chemical or actinic focus, provided only the focuser be adjusted for the actinic rays. It is well known that the expensive photographic lenses on the market are highly complicated combinations of as many as six and more simple lenses and have had to be made so complicated mainly to secure the coincidence of the visual focus with the photographic focus so that when the camera is in focus for the eye it shall be equally in focus for the photographic rays.

The multiplication of lenses by increasing the number of reflecting surfaces and the thickness of the glass, obstructs much light, and makes it often difficult in instantaneous photography to obtain with the more perfect lenses results as satisfactory as those arrived at with the cheaper lenses of simple construction.

In my camera I may use a very simple lens yielding a photographic or actinic image as bright and clear as that yielded by the more expensive lenses and which will require less exposure in the same light or the same exposure in a feebler light; or again, I may make a lens regardless of expense as complicated as desired but photographically more perfect than can possibly be made when the visual focus has to be taken into account.

A further and very important advantage of my invention is that with its aid lenses of very long focus may be used in the so-called hand cameras which are now made of short focus, in order that they shall never be too badly out of focus either when used for general work as fixed focus cameras, or when used for close work and focused more or less correctly by estimation of the object distance. It is highly desirable to have a long focus camera to avoid the exaggerated perspective effects got with short focus cameras in attempting to secure a picture of reasonable size. A long focus is also useful in photographing boats and other objects which are usually at a great distance from the operator; but as such objects occasionally come close, they would, with a long focus camera, quickly move out of focus if some separate and rapid means such as mine were not provided for focusing while the object is moving and about to be photographed. Any camera provided with my focusing finder attachment becomes a hand camera if it is not too heavy to be handled, and any focusing hand camera provided with such attachment may be used for taking pictures without blur as close as the greatest depth of the camera will permit, which is not the case in focusing by estimation of distances. The necessity for something of this kind is so great that many efforts have been made in this direction. The practical device that comes nearest to mine consists of a duplicate or twin camera, one part of which is used exclusively for focusing by the ordinary process on the ground glass, and the other part, which is simultaneously adjusted with the first, is exclusively used for exposing; but besides being very cumbersome, this device has all the objections of the usual method of focusing, one of the most important of which, not yet mentioned, is that an operator without considerable practice cannot possibly know whether the apparatus is in sharpest focus except by changing the focus in both directions to see if the image is thereby blurred. In many cases, even with the best lenses, this blurring is a factor very uncertain and very difficult of appreciation. A more convenient but still very cumbersome arrangement is that found in the so-called "reflex cameras" which contain a hinged mirror that reflects the lens image against a ground glass mounted in the upper wall of the camera. But such reflex cameras have all of the disadvantages noted above as incidental to ground glass focusing, and they have the further disadvantage of cutting out the visible finder image during and an instant before exposure, and such "instant before," however short, is specially valuable in quick exposures.

My device uses at least two distinct groups of rays that proceed externally of the camera, a principle that seems to have first been disclosed by Garceau in French Patent No. 256,838 of June 1, 1896. Garceau, however, is hampered by the limitations involved in the use of a basic triangle that is rectangular and that forces him to mount his main pivot at a considerable distance in front of his camera or, in view of disclosures made in my said Case Ae, in the outer focal plane of the lens. Garceau endeavors to bring such main pivot back onto the camera, but in doing so he departs from his theoretically exact form and he introduces errors which he discusses at considerable length, proving that they are of no consequence except when the object is close to the camera; but it is when the object is close that the present invention becomes most useful.

By my invention no limitations whatever are placed on the shape or form of the basic triangle, which generally is obtuse angular, and as a result my main pivot may in theory, as well as in practice, be located in any arbitrarily desired and most convenient relation to the camera lens. Another consequence is that such main pivot may be located in any such preferred position at the factory for use with different lenses, if the mechanical connections and transmissions are provided with the certain adjustments that are necessary to permit of adjusting and regulating the device for use with such different lenses.

In current practice all lenses are different lenses, even such as are of the same make, type and nominal focal length, and, therefore, no focusing means is practical even when the lens is combined therewith at the factory, unless it has such adjustments. I have made the important discovery that such adjustments to be practical must be independent of each other, or such that the making of any one in its proper order does not appreciably disturb any other adjustment previously made; also, that at least three of such independent adjustments are necessary in the complete theoretically exact form. At the filing date of the present application, however, the only forms that I am able to disclose with independent adjustments are approximate solutions containing only two independent adjustments. Such forms, however, are designed to secure a mathematically exact two-point correspondence of the camera and focusing combination, and this exact two-point correspondence is an entirely novel and valuable practical result, especially as one of these two points may be selected as close to the camera as may be desired. I attach so much importance to these adjustments that I shall make no claims to the theoretically exact solutions in the present application where the theoretically exact forms will be used exclusively as a theoretical foundation leading up to and an justification of the approximately exact forms containing two independent adjustments, such being the forms that I desire to and do claim herein.

Figure 7:
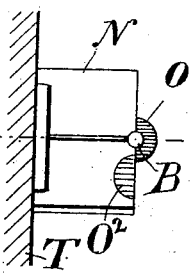
Figure 8:
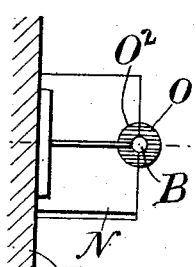
Figure 9:
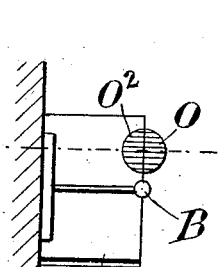
Figure 10:
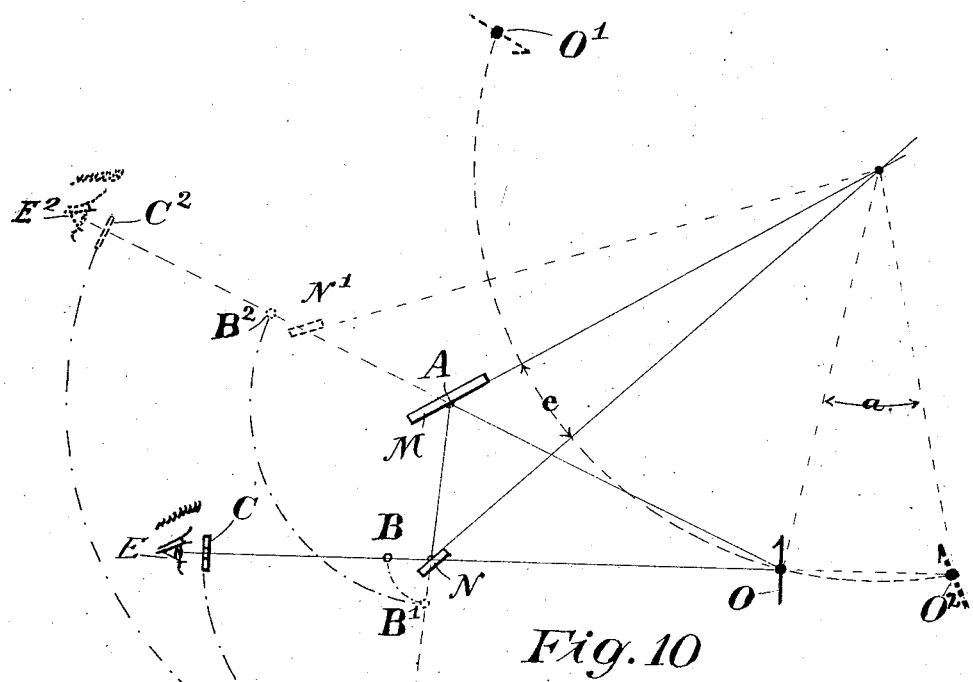
Figure 12:
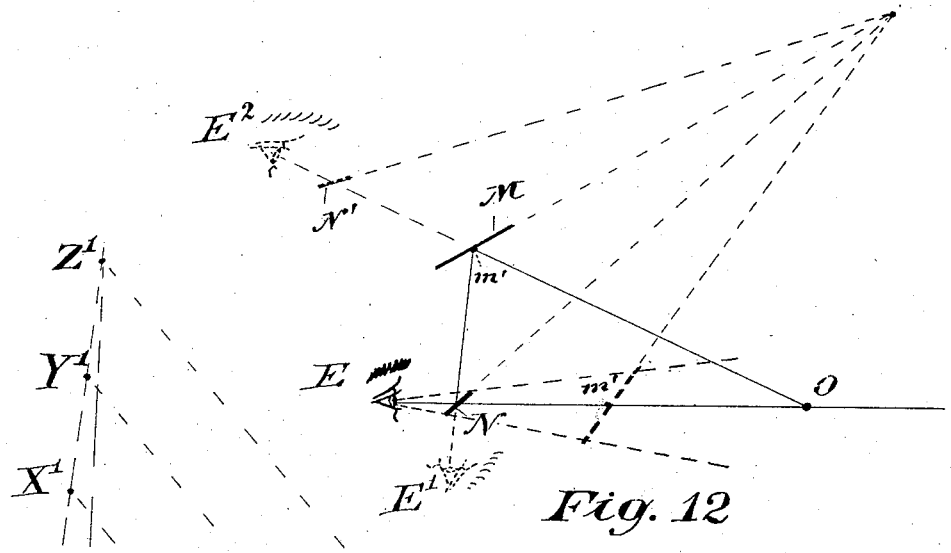
Figure 11:
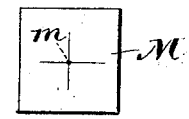
Figure 13:
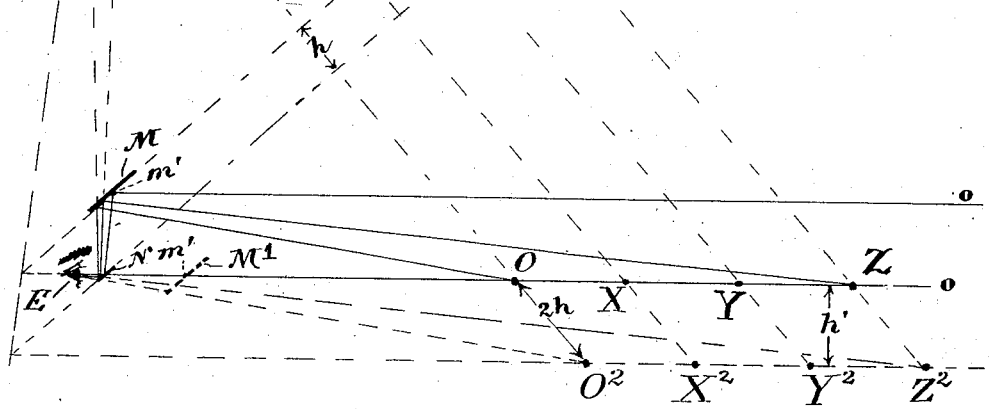

In the accompanying drawings: Figure 1 is a side view, partially in section, of an embodiment of my invention in elementary form; comprising a camera of adjustable depth and means connected therewith for sighting from two points on the camera a point O to be photographed. Fig. 2 is a diagram pertaining to Fig. 1. Fig 3 is a side view, partly in section, of an automatic form of my invention. Fig. 4 is a side view, partly in section, of an automatic form containing mirrors to permit of sighting simultaneously, from the two sighting points on the camera, the same object point O, to be photographed. Fig. 5 is a modified form of a detail in Fig. 4. Fig. 6 is a view of the eye mirror in Fig. 4, showing the same as it appears to the observer. Figs. 7, 8 and 9 are similar views, showing the different phases of the operation of sighting a point O and how all of said point which lies concealed behind the mirror is seen therein by reflection from the other mirror. Fig. 10 is a diagram showing how the mirrors are set and act when the reflected part of point O registers with the part seen directly. Fig. 11 is a face view of the object mirror, showing a mark made thereon to avoid the use of the original sights. Fig. 12 is a diagram similar to Fig. 10, but serving to illustrate the use of the mark shown in Fig. 11. Fig. 13 is a diagram showing how the mirrors act when parallel to form of any point an image whose distance to the original of said image is equal to twice the distance between the planes of the mirrors. Figs. 14 and 15 show two different forms of the type shown in Fig 3, that is, forms requiring two separate sighting operations. Fig. 16 shows a modified detail of Fig. 15. Fig. 17 shows in part a simplified modification of the type in Fig. 4, and Fig. 18 shows a practical working form of the same as adapted to a folding camera. Fig. 19 is a modification of the preceding form, such modification being provided with adjustable elements to allow for differences in the focal length of the objective and in the location of its two principal focal planes. Figs. 20 and 21 are views of details in the camera of Fig. 19. Fig. 22 is a diagram pertaining to the camera of Fig. 19. Fig. 23 is a diagram adapted to represent almost any theoretically correct form. Fig. 24 is a diagram to illustrate the relation of image distances to inclinations of arm $D^n$, and indirectly to inclinations of the mirror which revolves half as fast. Fig. 25 is a modified form of my invention approximately equivalent to the theoretical form. Fig. 26 is a diagram showing how the pivot of arm $D^n$ of Fig. 23 should be displaced with respect to path H J when it is desired to make said arm revolve more or less than twice as fast as the mirror. Figs. 27, 28, 29 and 30 are different simplified forms approximately equivalent of the theoretical form Fig. 18.

Figure 28:
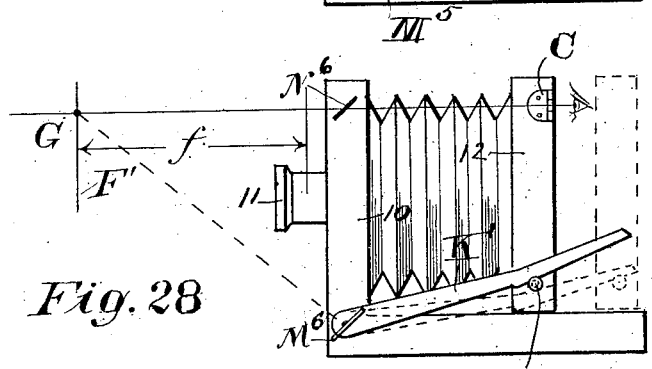
Figure 29:
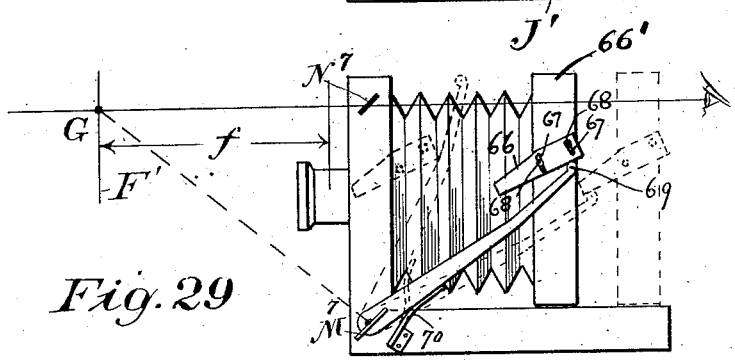
Figure 31:
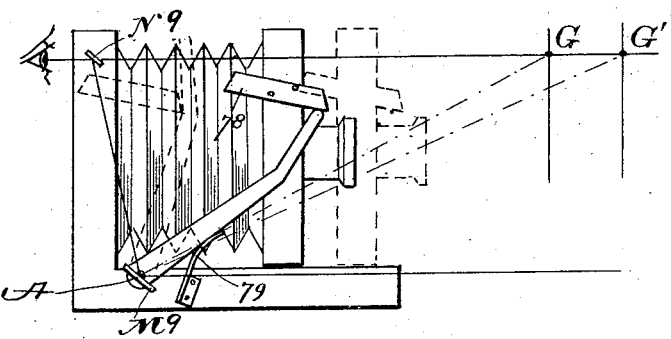
Figure 32:
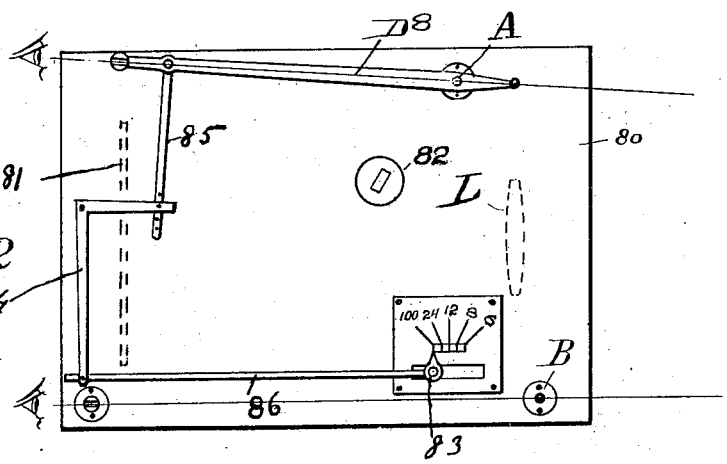
Figure 33:
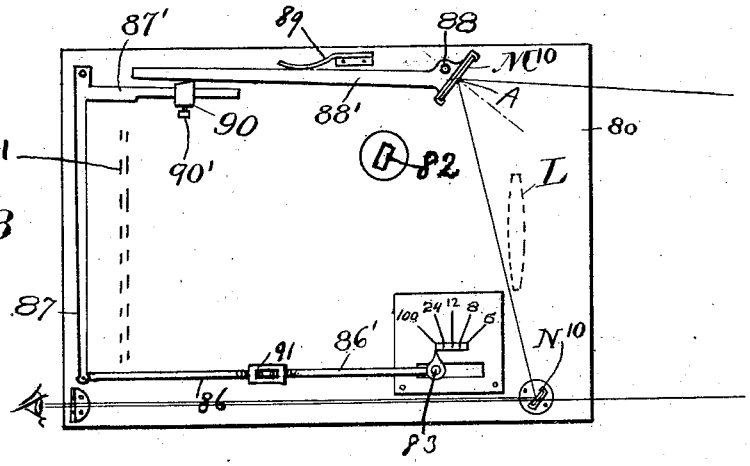
Figure 49:
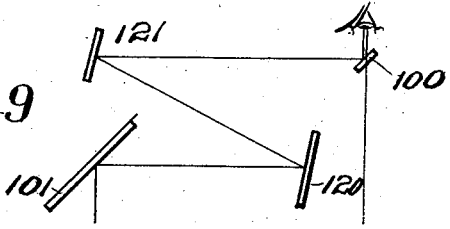
Figure 50:
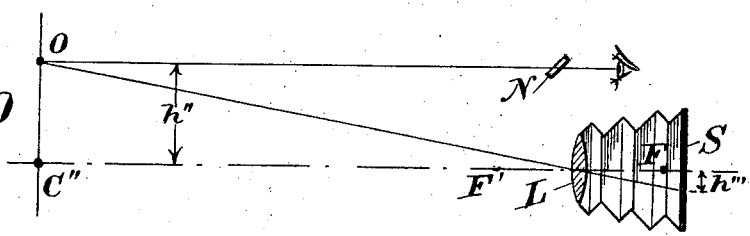
Figure 57A:
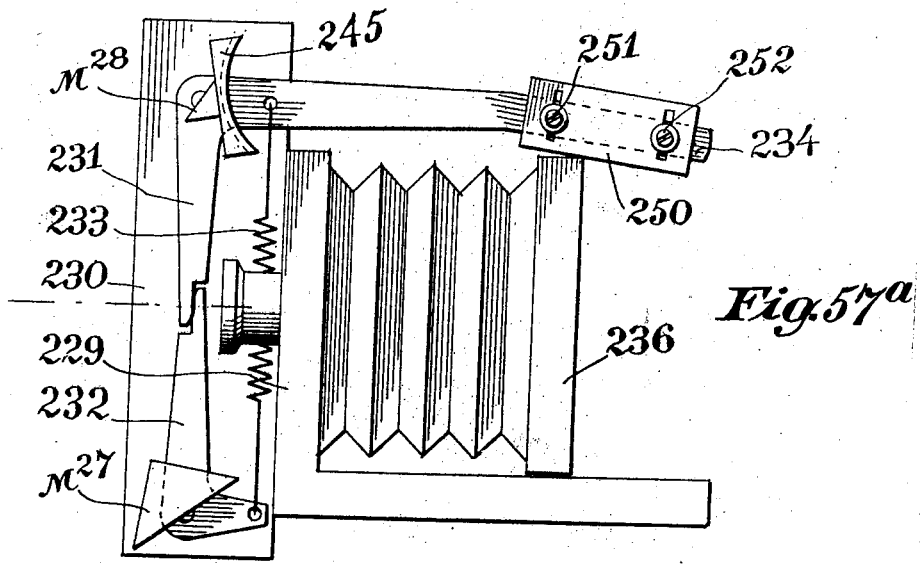
Figure 57B:
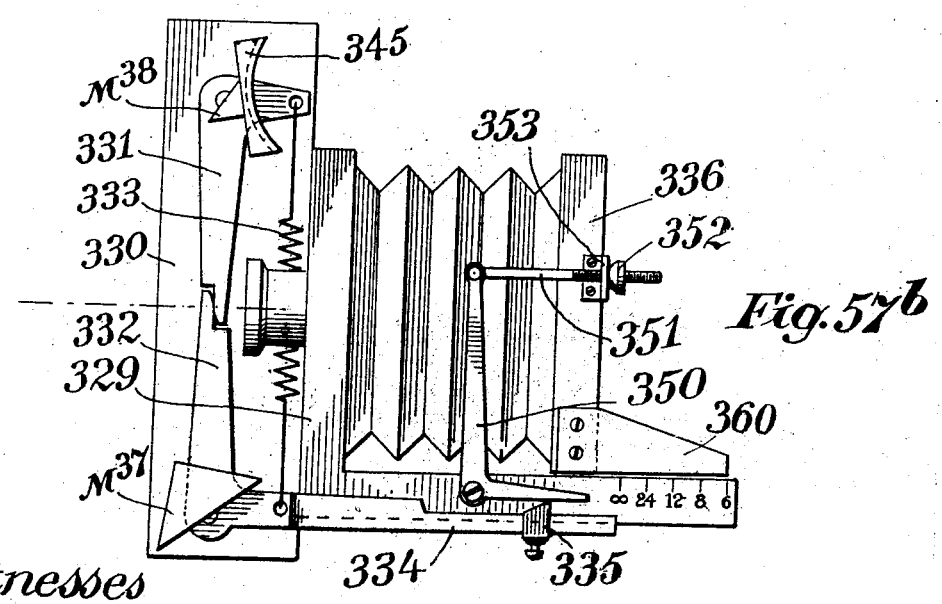
Figure 58:
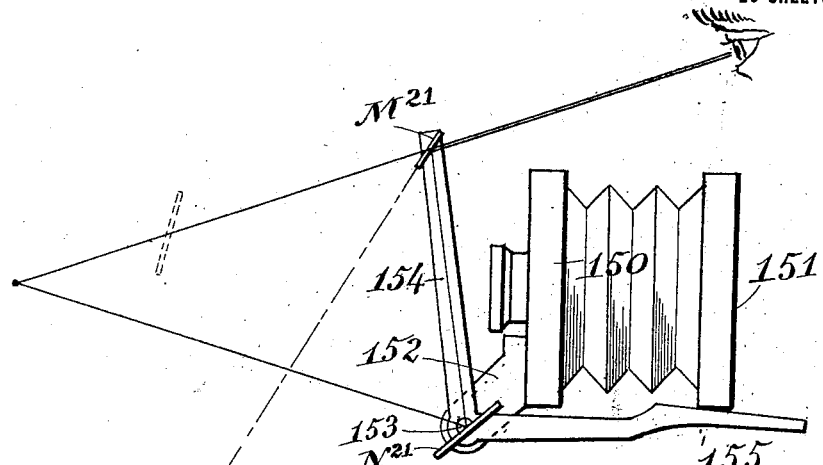
Figures 59, 60:
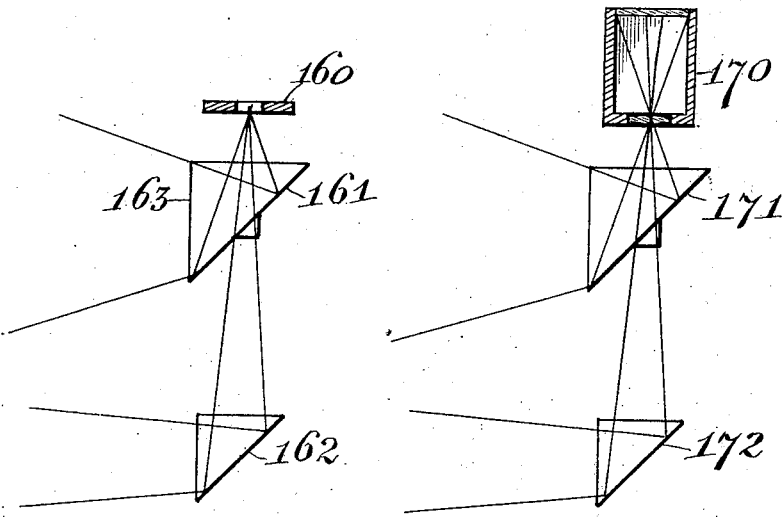
Figure 61:
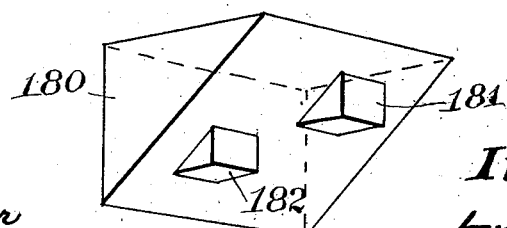

Fig. 31 is an inverted form of the type shown in Fig. 29 and differs therefrom and from all other mirror forms shown in that the fixed mirror and the pivoted mirror are mounted on the plate holding frame, instead of on the lens holding frame. Fig. 32 shows a camera of the common non-folding type, with plain sighting means such as in Fig. 3, but provided with an approximately constant velocity ratio mechanism. Fig. 33 shows a mirror form modification of the preceding. Figs. 34 to 38 are diagrams all relating to different forms in which one part of the object is seen directly and the other part is seen by reflection from the two mirrors. Figs. 39 to 42 are diagrams all relating to different forms in which both parts of the object are seen indirectly, each by a single reflection. Figs. 43 to 48 are diagrams showing how reflecting prisms are substituted for plain mirrors. Fig. 49 shows an arrangement having a pair of auxiliary mirrors. Fig. 50 is a view illustrating parallax, and Figs. 51 to 54 are views of different forms in which parallax is avoided. Figs. 55 and 56 are a side and a front view, respectively, of a camera provided with a focusing attachment containing two symmetrically pivoted mirrors to avoid parallax, and a divergent lens finder combined therewith for limiting the extent of field seen to what is actually included in the camera plate. Fig. 57 is a side view of a form which is equivalent to the preceding, but which is of the simple reflection prism type shown in Fig. 46. Fig. 57$^a$ illustrates the form assumed by Fig. 55 when its cam is made adjustable in the manner referred to in the detailed description of Fig. 28; and Fig. 57$^b$, which was added as showing a single structure on which all claims hereinafter made are readable, illustrates the form assumed by Fig. 55 when its cam gear is replaced by the lever gear of Fig. 33. Fig 58 is a side view of a form in which parallax is avoided by using two symmetrically arranged mirrors, one of which is fixed and the other pivoted on an axis in the plane of the fixed mirror. Figs. 59 and 60 are figures further illustrating the principles involved in making the field of the focusing means correspond with that of the camera. Fig. 61 shows a modification of the eye prism in Fig. 46.

My invention is based primarily on a peculiar correspondence which I have discovered between rays of light from any point to and through a lens and other rays of light diverging from the same point but passing by or outside of the lens, whereby the distance of the image formed by the inside or lens rays may be exactly known from the course of the outside rays, and whereby an observation of the course of these outside rays will be sufficient to determine the proper relation of lens and sensitized surface for the corresponding inside rays. This correspondence is illustrated in Fig. 1 for a lens L between a pair of inside or lens rays from a point O to its image I and a pair of outside rays OA and OB from the same point O, and it consists in that the outside ray OA meets a fixed scale Q' at exactly the same graduation mark where a screen S set to receive image I meets a similar fixed scale Q. This correspondence may be verified with the aid of the apparatus shown, which is in fact an elementary embodiment of my invention.

T represents a base or table which would naturally be used in a horizontal position, but which I show as vertical, in order to facilitate comparison with those other forms of my invention that are described in this specification. On the table is fixed the lens L which is connected by means of the usual extensible and light tight bellows with the ground glass screen S. This screen is mounted to slide on the table to permit of focusing by the ordinary methods, and its displacements on the table may be accurately measured by means of a scale Q, the graduations of which are equal and in any conveniently small unit. The zero mark of this scale Q is determined by setting screen S sharply in focus on a very distant object. On the same table, beside the lens, are fixed a bead sight B and a peep sight C, alined parallel with the principal axis of the lens, and anywhere at a distance from the line B C is fixed a pintle A, on which is mounted an alidade D, provided with sights B' C' and having a straight edge D' in line with such sights. The alidade sweeps over a scale Q' which is an exact duplicate of scale Q, and which is set as hereinafter explained to secure the correspondence in question.

When the camera is focused on a very distant point its focusing screen S is brought into exact coincidence with the focal plane F of its lens L. To focus on a point O that is close, the depth of the camera must be increased and the amount $i$ of this increase being equal to the distance of the image I from the focal plane F is what I shall call the image distance $i$. I shall similarly call object distance $d$ the distance OG of the object O from the outside focal plane F'. The inside focal plane F being the focal plane for rays coming from a great distance at the right, the outside focal plane F' will be understood to be the focal plane for rays coming from a great distance at the left. The image distance $i$, the object distance $d$, and the focal length $f$ of the lens form a very simple equation, to wit:

$$id = f^2 \quad (1)$$

Gauss, in his lens theory, proves that this equation 1 is true for any lens, however complicated the lens may be; and it, therefore, is entirely independent of lens thickness, which is such a disturbing element when the object and image distances are measured as usual from a so-called "optical center."

The observer with his eye at E first sights any point O along C B, and then shifting his eye to the end of the alidade at E² he turns the alidade so as to be able to sight the same point along the sights C' B' of the alidade; he then notes the reading of edge D' of the alidade on scale Q' and by setting screen S so as to get the same reading on scale Q he will find that S has been placed where it gives the sharpest image of point O. In the case illustrated, the reading is seven units of the scale. In order that this be true for all distances of point O, the scale Q' must be in a certain position which depends on the relative positions of the lens L, point A and point G the latter G being where the line B C produced meets the outside focal plane F' of the lens; that is, the scale Q' must lie parallel with line A G, and its zero point must be at the end H of a line H A parallel to B C and of a length equal to the quotient of A G into the square of the focal length of the lens or more simply of such length that $$HA.AG = f^2 \quad (2)$$

and this can be proved as follows: From equation 1, above, we derive $$i = \frac{f^2}{d} \quad (3)$$

On the other hand, whatever the position of O in line B G produced, the line O A, produced to J, forms two triangles JHA and AGO, which are similar and which yield the proportion $$\frac{JH}{HA} = \frac{AG}{GO}$$

whence, substituting $d$ for GO, we derive $$JH = \frac{HA.AG}{d} \quad (4)$$

Now, in order that JH of equation 4 and $i$ of equation 3 shall be equal, we need only make the second members of these equations equal, thus $$\frac{HA.AG}{d} = \frac{f^2}{d}$$

whence $$HA.AG = f^2$$

which is identical with and, therefore, proves equation 2.

The rule given above for determining the position of scale Q' is useful as a scientific definition and to establish principles, but it is not convenient to apply because it involves the determination of point G and of the focal length $f$ of the lens. In practice neither $f$ nor G need be considered. The exact position of the scale may be found by observations on three points at different distances along C B extended, these points being selected—one at infinity or very far away, the other very close and the last at a convenient distance between the other two. The alidade is aimed in succession at the three points and the direction $l'$, $l''$, $l'''$ Fig. 2 of rays from the three points is traced by running a pencil along the straight edge D' of the alidade. A blank strip of paper Q'', Fig. 1, is then pinned near the screen frame and screen S is sharply focused in succession on the three points and the three positions of any given point of the screen frame are indicated on the edge of the strip Q'' by means of three marks $r'$, $r''$, $r'''$. The three distances of these marks, $r'$, $r''$, $r'''$ from the infinity mark, which in this particular case is identical with mark $r'$, that is: $r'\ r'$ or zero, $r''\ r'$ and $r'''\ r'$ represent the image distances of the three object points. The strip Q'' is now unpinned and placed over the three lines $l'$, $l''$, $l'''$ Fig. 2, and shifted about until it is set as shown in dotted lines so that its three marks $r'$, $r''$, and $r'''$ shall coincide with their three corresponding ray inclinations $l'$, $l''$, and $l'''$. There is only one position in which this threefold coincidence can occur, as proved both geometrically and algebraically in Figs. 40 and 41 of my said Case Ae, and when the position of scale Q' has been once determined by the threefold coincidence, the apparatus can be used in the following manner to sharply focus on any given object point. First, the apparatus as a whole is aimed and fixed so the object point may be sighted along line C B; secondly, alidade D is turned until the same object point can be sighted along line C' B'; thirdly and finally, screen S is set by its scale Q at the image distance which is indicated on scale Q' by arm D. The apparatus shown in Fig. 1 is, therefore, seen to be a complete and scientifically accurate combination for securing within a camera the sharpest possible image of any object to be photographed.

I shall now describe with the aid of Fig. 3 a form in which the third or focusing operation of the form of Fig. 1 is avoided and made entirely automatic. This automatic form is in every respect substantially the same as the form of Fig. 1, except that it is provided with mechanism for automatically securing equal motions at the places that would be occupied by scales Q and Q' of Fig. 1. The sighting bar D² of this automatic form, corresponding to bar D' of the first form, is of slightly modified construction, being provided with a slot D³ in which is adapted to slide a pin J' the center of which corresponds exactly to the point J of Fig. 1. Pin J' is fixed on a rack-bar R guided to slide in a way W, parallel to the direction AG and so as to carry the pin J' along a line corresponding to the original scale Q' of Fig. 1. The rack R is reciprocated by revolving a pinion P, which pinion is made wide enough to also act at the same time and in the same degree on a rack-bar R' connected with the screen S. Motions of the screen S and of the alidade $D^2$ are thus made to correspond as required by theory. To focus on any given point the operations with this apparatus reduce themselves to two, as follows: First, the apparatus as a whole is aimed and fixed on a firm base so the object point may be sighted from E along line C B; secondly, alidade $D^2$ is turned, by turning pinion P, until the same object point can be sighted from $E^2$ along line C' B'. No third operation such as required with the form of Fig. 1, is necessary because said operation is accomplished, in the present form, automatically through the mechanical connections described.

In Fig. 4 I show a highly improved form which differs from that of Fig. 3 principally by the presence of means for carrying the ray OA down to and in line with the ray OB, so the observer may virtually sight from A without moving his eye away from position E. By this means the operation of sighting from the two points A and B is virtually effected from the one point B, and, furthermore, as will appear later, the necessity for a tripod or other firm support disappears. In Fig. 4 the means shown for leading the ray OA into the same general direction as OB, and by adjustment exactly in such direction comprises essentially two mirrors M and N set perpendicularly to the table. The mirror M is pivotally mounted at A so it may be turned to reflect any ray as OA to the mirror N, and the mirror N is firmly fixed to the table on line C B so as to reflect any ray from A to and along B C.
The angular set of mirror M is controlled through an arm K which is fixed to and turns with the mirror. This arm K is not suitable for direct connection with the rack in the same manner as the alidade $D^2$ of Fig. 3 because the angular displacements of the mirror are, as I shall show later, only one-half those of the alidade in similar circumstances, and hence I have provided an auxiliary arm $D^4$ which is moved as shown by the rack according to the same law as the alidade $D^2$ of Fig. 3, but which is geared to arm K in such manner as to make the angular movements of the latter just exactly one-half its own as required. To secure this result I have devised the very simple means shown, consisting of a radial slot $s$ in arm K and a pin $p$ set on arm $D^4$ at a distance $pA'$ from the pivot A' equal to A'A or the distance between the pivots of the two arms. The pin $p$ in Fig. 4 is shown in line with the slot in arm $D^4$ but it may be anywhere else on said arm, as in the modification Fig. 5, provided only $A'p=AA'$. In Fig. 5 parts $D^5$, $K^1$, and $p^1$ correspond, respectively, to parts $D^4$, K, and $p$ of Fig. 4.

Whatever the position of the parts, the triangle $pAA'$ in Fig. 4 is necessarily isosceles with a variable base $Ap$. Its fixed side $AA'$ produced forms an angle $pA'H'$ equal to the sum of the equal angles in the triangle, that is equal to twice angle $pAA'$. By changing $p$ to $p'$ the same reasoning may be repeated word for word on Fig. 5, proving geometrically for Figs. 4 and 5 and generally that the pin and slot arranged as stated constitute a perfect gear for reducing angular motion in exact and constant ratio of one to two.

Mirror N projects from the table T to such a distance that the parts when viewed from the peep C will appear as shown in Fig. 6 where the outer or vertical edge of the mirror N appears to bisect the bead. The projecting part of the bead serves for the direct rays which are to come from O by the edge of the mirror N and the other part of the bead serves for the rays reflected in N.

The observer with his eye in position E Fig. 4 looking through the peep C aims the apparatus at a point O as he would if no mirror were present; that is, he covers the directly visible part of the object O Fig. 7 with the projecting part of bead B and when he has done this he observes that the part of object O which is concealed behind the mirror appears reflected in mirror N as $O^2$, Fig. 7, generally out of line with the bead. To bring it in line he turns the pinion P' which indirectly by the same means described above turns the mirror M. When both the unconcealed part of the object O and its image $O^2$ are in line with the bead, they are seen to register perfectly as in Fig. 8, and the impression made on the observer is that the mirror N has suddenly became transparent. This registering once obtained, persists when the apparatus is slightly displaced as in Fig. 9; that is, when the instrument is not directly aimed at O; and as such disturbance does not appreciably change the distance of the object nor its image distance and therefore involves no change in focus, the matching may alone be relied on as a sufficient indication that the camera is in focus. This is the most important feature of my invention because in virtue thereof the matching may very easily be got and retained without steadying the apparatus on a tripod or other rest, making it possible to use my reflecting focuser with any focusing hand camera.

The bead B may with advantage be replaced by a mark or nick on the edge of the mirror N, but even such a mark may be dispensed with by making the mirror N rather small, and when N is made small the peep sight C also may be omitted, as I shall show below.

I have described above the mechanical means which I have devised for connecting the pivoted mirror with the screen. I will now explain why such an arrangement is necessary. The mirror N Fig. 10 forms an inverted image $B^1C^1E^1$ of the original sights B, C and of the eye. That is, an eye placed at A would see the sights B, C and the eye E all reflected in N as if they all lay at $B^1C^1E^1$. This first image by reflection in mirror M becomes the erect image $B^2C^2E^2$ which is plainly visible from O as turning with mirror M about A as a pivot and as pointing directly at O when the mirror N is set to secure the image registration of Fig. 8 for an eye in position E. The erect image $B^2C^2$ is therefore virtually an alidade pivoted at A and having angular displacements corresponding exactly to those of the original alidade E in Fig. 1. Mirror M always bisects angle $B^1AB^2$ and hence its angular displacements must be exactly half those of the virtual alidade; and before any mechanical connection can be made with screen S an arm $D^4$, Fig. 4 must as described above be provided, whose angular motion about its pivot $A'$ will be exactly equal to those of the virtual alidade; that is exactly double those of arm K. In this same Fig. 10 I have also shown how the image $O^2$ is formed and where it lies when it registers as shown in Fig. 8 with its original O and with the bead B. Point O forms by reflection in mirror M a first inverted image $O^1$ and this by reflection in mirror N a second but erect image $O^2$. Points O, $O^1$, and $O^2$ are all distributed on the circumference of a circle having its center at the point where the produced surface of the pivoted mirror M meets the produced surface of the fixed mirror N. The distance $OO^2$ is equal to the chord of twice the arc $e$ included between the mirror surfaces and varies little, remaining almost constant for all distances of O; but the image $O^2$ is also inclined to its original O and this inclination being equal to angle $a$, must increase as O approaches. The image $O^2$ being farther from the observer than O and moreover inclined, must always appear smaller than O and the registering (which in any case occurs only in the observer's eye) cannot be exactly made for more than one point of the object. This is not a serious objection because the difference between the apparent sizes of object and image does not become noticeable until the distance ON is relatively as short as in Fig. 10, a degree of approach which is rarely equalled in practice because there is no necessity, I have found, for making the distance AN more than three inches.

By making the mirror N rather small and by placing a cross or similar mark $m$ at the center of mirror M Fig. 11, the peep sight C and the bead sight B may both be dispensed with. This arrangement is diagrammatically shown in Fig. 12 where the eye at E sees the fixed image $m'$ of the mark acting as a bead and as it sees it apparently through the small mirror N said mirror is the full equivalent of a peepsight. The virtual eye at $E^2$ in the same manner may be considered as aiming through the image $N^1$ and through the mirror M. The omission of all sights greatly simplifies my apparatus and permits me to convert any focusing camera into one of my self-focusing hand cameras, if the camera is at all portable by the simple addition of three essential elements, to wit: a small fixed mirror, a larger pivoted mirror properly marked, and suitable gearing to secure the desired correspondence between the motions of the different parts.

While the eye detects the slightest departure from continuity due to any shift of image $O^2$ in mirror N Fig. 7, it may be desirable to make the motions of the image as extended as possible and it therefore becomes important to know how and to what extent the image is displaced. This can best be seen by supposing the mirrors set parallel as in Fig. 13; that is, set as they are when sighted on a very distant point which sends substantially parallel rays $oM$ and $oN$ to the centers of the two mirrors. The ray $oM$ after reflection at M goes to N and thence parallel with the direct ray $oN$ to the eye. The series of points O, X, Y, Z form in mirror M a series of images $O^1$, $X^1$, $Y^1$, $Z^1$, which in turn form in mirror N the series of images $O^2$, $X^2$, $Y^2$, $Z^2$, all lying in a line $O^2 Z^2$ parallel to $oN$. Supposing O to be the closest point to be photographed at any time, the reflected ray from O follows the course shown entering the eye as if it came from $O^2$. An intermediate point as Z sends a reflected ray which enters the eye as if coming from $Z^2$. Any one of these last images is separated from its original as $O^2$ from O by a distance equal to $2^h$ or twice the distance between the planes of the mirrors; but for the eye at E the separation is virtually only $h'$ or the distance between the lines O Z and $O^2 Z^2$ and the apparent or angular separation goes decreasing as the distance increases, being for point Z about one-half what it is for point O. For mirrors at about 45 degrees which is the preferred angle, the apparent shift $h'$ equals the distance from pivot A to mirror N. The matching of any one of the images with its original in the operation of focusing consists simply in carrying it from line O² Z² up behind its original into line O Z (Fig. 13) and the angular motion required to secure this matching in the conditions of Fig. 13 is proportional to the apparent angular displacement of the image which is larger as the point observed is closer.

*Compact forms.*—The forms so far described have been devised with the main object of clearly showing fundamental principles and types. In practice the sighting parts of the instrument, as compared with the camera proper, are relatively much smaller than shown in Figs. 1 to 5, and instead of being placed to one side on a special extension, they are on the contrary, mounted as closely as possible against the camera framing, and in my preferred forms, well within such framing so as to be protected against injury.

In Figs. 14 and 15 I show simplified compact forms of the type of Fig. 3; that is, forms that require two separate sightings and which therefore cannot be used without a firm support or tripod V″. In the form of Fig. 14 the camera proper comprises a rigid L shaped frame 10 in which is mounted the objective 11 the lens of which has its focal planes at F and F′ and a focal length represented by $f$. On the frame 10 is adjustably mounted the frame 12 in which is carried the sensitized surface to be impressed, and as the instrument is shown set for rays from infinity this surface now coincides with the focal plane F. The horizontal member of the frame 10 has a bead sight B and a peep sight C and the line through these meets the focal plane F′ at G. The vertical member of the frame 10 carries a crosspiece or double bracket 13 the outer end of which carries a pin A corresponding to the pintle A of Fig. 3, but here used as a bead sight, and the inner end of this crosspiece carries a pulley 14 over which passes a flexible but inextensible line 15 having one end fastened to the frame 12 at 16 and kept taut in the direction parallel with line A G by a spring 17 fastened to its other end and to the camera frame 10 at 18. This line carries fixed at one end a peep sight shown as a knot H in the line but which should rather be an aperture, for which reason the line is preferably made in the shape of a metallic ribbon or chain. When the apparatus is, as shown, focused on infinity the points A and H are in a line parallel with line B C, and the distance AH which corresponds to AH of Fig. 3, equals the quotient of AG into the square of the focal length of the lens. Motions of the peep sight H are therefore, in accordance with the principles set forth in describing Figs. 1 and 3, equal to the requisite corresponding motions of frame 12 and the equality of these motions is insured by the direct inextensible line connection 15. In use the camera is first aimed by sighting along C B at a point to be photographed and then it is firmly clamped to its tripod so as to preserve the aim. The operator then sets the peep H by adjusting frame 12 until he can sight the same point along sights H and A. The point thus sighted is surely and exactly in focus and may be confidently photographed without inspection of its image.

If the frame 12 is shaky at the top it is better to carry the line 15 as shown in dotted lines down to and around a pulley 19 mounted on the frame 10 and thence horizontally to point 20 near the lower end of frame 12 which end is generally steady. When the frame 12 is steady throughout or can be made so, I prefer, as simpler, more compact and convenient, the arrangement of Fig. 15 where the lens and camera are, to facilitate comparison, the same as in Fig. 14. The line 21 in this second form is run horizontally from a point 22 at the top of frame 10 to a pulley 23 at the top of frame 12 and thence down to a pulley 24 in a direction such that the bisector HJ of the angle J′HH′ shall be parallel with line A G which, it should be noted, is in this figure more inclined and longer than in Fig. 14 owing to the placing of point A farther back directly on the frame 10. When the camera is, as shown, in focus for infinity the horizontal distance AH from A to the inclined part of line 21 should, as before, be the quotient of AG into the square of the focal length, and as AG is now larger AH should be smaller. From the pulley 24 the line 21 runs down around an idler 25 and thence horizontally to a point 26 at the extreme left of frame 10, where it is fastened. In some cases it is possible to set pulley 24 low enough to permit of omitting the idler 25. A peculiarity of this form is that the peep at H does not travel in the direction of the line holding it, but along the bisector HJ, because its motion is compounded of the motion HJ′ along the line and the horizontal motion HH′ of frame 12. The line 21 may in the same manner as line 14 of the other form, be kept taut by a spring; but this is not necessary because the total length of the line between points 22 to 26 remains constant for all displacements of frame 12. However, a spring might be used with advantage and should preferably be a flat spiral or watch spring acting on pulley 23, Fig. 16 to wind about said pulley what appears in Fig. 15 as the upper horizontal part of the line. The frame 10 is divided and hinged at 27 in the usual manner to permit of folding.

As was before stated, the cameras of Figs. 14 and 15 just described cannot be used except with a tripod V″ for holding them firmly in place; but they commend themselves for their cheapness and simplicity and when taken with Fig. 3 are moreover excellent illustrations of how great can be the difference in form without any change in the fundamental principle.

I shall now first describe how compact forms of the type shown in Fig. 4 may be derived from such original type; and then I shall show what general rules should be followed in designing exact equivalents and other equivalents which are only approximately exact, but which have the advantage of being extremely simple.

In Fig. 4 I selected for the arm $D^4$ a position that would best show the connection between that figure and Figs. 1 and 3; but it is clear that so long as the mirror M is not disturbed the arms K, $D^4$ and the gearing of this figure may be arranged in many different ways that will all be mechanically equivalent. Thus supposing the mirror M temporarily fixed to table T instead of to its arm K, the arms K and $D^4$ and the rack R may, without disturbing their relative positions, be turned bodily in counter clock-wise direction until the rack R lies as seen in Fig. 17 parallel with rack R'. The rack R and the rack R' being now parallel and to be moved equally, may be rigidly connected by a bar 30 and the pin J' is thus fixed with relation to the camera screen S, dispensing with all intermediate gearing.

Examination of Figs. 4 and 17 shows that when the camera is focused on infinity and the mirrors are parallel, the arm $D^4$ which is then in its zero position crosses the path of pin J' at an angle $r$ equal to the angle AGO and that the effective length A'H' of the arm $D^4$ at this instant equals the quotient of AG into the square of $f$. These conditions being satisfied, the pin and slot connection between arms K and $D^4$ can without difficulty be made of any form to suit, and the mechanism will operate as described. While the conditions are inflexible, they are few and leave so many other factors undetermined that the device may assume an infinite variety of forms and proportions.

In designing an instrument points J', A and G and the position of mirror N on the line through G may all be selected at will, but they are of course distributed to suit the proportions of the camera proper. Thus in Fig. 18, where 10, 11 and 12 is a common folding camera, suppose points G, A and J' to have been selected where shown. The first thing to do is to properly set the fixed mirror $N^2$ anywhere on the line through G, but so inclined that its reflecting surface will bisect angle GNA. Mirror $M^2$ is then drawn through A, parallel with mirror $N^2$; frame 12 is now drawn in the position corresponding to the parallel set of the mirrors, that is in focus for infinity or so that the sensitized surface to be carried in this frame shall coincide with the focal plane F. The focal planes F and F' and the focus $f$ are supposed to be known. Finally, the position of the pivot of arm $D^5$ is to be determined by first drawing the path Q' to be followed by pin J', and through the first point J' of the path two lines J' A' and J' A" are drawn, making with Q' an angle $r$ equal to angle $r$ at G and having a length equal to the quotient of GA into the square of $f$. The pivot of arm $D^5$ may be either at A' or at A", but A' is selected so that the arm will revolve in the same direction as mirror M. Arm $D^5$ may now be drawn, and should be made as long as practicable, but there is no use in making it longer than required for the extreme opening of the bellows. Arm $D^5$ and mirror $M^2$ should now be connected by means of the pin and slot gear of Figs. 4 and 5, of a form that will take up the least room when the camera is folded; for this purpose the part of the slot in arm $K^2$ which does not come into contact with pin $p^2$ until the camera is being folded is suitably curved so the arm $K^2$ will be turned well in out of the way to the dotted position shown. In certain arrangements such as that of Fig. 19 a similar curving of the slot in arm $D^6$ may be necessary, but in either case care should be taken to keep perfectly straight and radial the part of the slots which control motion when the camera is opened enough to take pictures.

In theory arm $D^5$ may be infinitely long and if the instrument were not intended to be folding and portable, the arm could be made as long as desirable without any limit except such as imposed by available space and strength of materials. Thus the apparatus of Fig. 18 might have its base extended to the left and the bellows and arm $D^5$ equally extended so the device could be used for enlarging in any desired proportion. This is one of the most useful applications of my discovery because the enlarged image of an object is often so dim that it is hardly perceptible on the ground glass for focusing by the ordinary method. My instrument gives the sharpest mathematical focus in all cases, even where the enlargement is so great as to make the image absolutely invisible.

In Fig. 18 the arm $D^5$ is long enough to permit of drawing frame 12 out to the end of bed 10 where it will take a picture about three fourths actual size. On the supposition that the camera could be opened to infinity, arm $D^5$ would be parallel to the principal axis of the lens, and mirror M would be sighted on point G which is in the focal plane F'. This is as it should be because any point of plane F' has its image at infinity. The correspondence between image distances and mirror inclinations is thus seen to be true for all conceivable cases.

In the instructions just given for designing a combination such as that of Fig. 18, I have supposed the focal length $f$ of the objective and the positions of its focal planes F and F' to be exactly known. But lenses cannot easily be made of a given focus. The best lenses often vary considerably from the focal length engraved on their mountings and therefore certain adjustments must be provided to allow for these probable errors. One of the many possible adjustable forms is shown in Fig. 19 where the adjustable elements of the device are the mirror $N^3$ and the pin J'. Mirror $N^3$ is adjustable to and from mirror $M^3$ and pin J' has a special adjustment which permits of setting it anywhere on frame 12.

The principal parts in Fig. 19 are substantially the same as those in Fig. 18, but their general arrangement is designed to bring point J' as close as possible to the steady base of frame 12; moreover arm $D^6$ corresponding to arm $D^5$ of Fig. 18 has the end of its slot curved (in a manner similar to that in arm $K^2$ of Fig. 18) to permit of folding into the dotted position where it cannot interfere with the adjustable mirror. Mirror $N^3$ is fixed on a small carriage 33 adapted to slide on a dove-tail bar 34, which is preferably an extension of the brass mounting 35, see Fig. 20, which is a view looking in the direction of arrow 36 Fig. 19. It would be better to design the device so this bar 34 shall lie parallel with the edge of frame 10, but I have shown it inclined to avoid the impression that the adjustment need be in any particular direction with respect to the camera. Carriage 33 may be clamped in any desired position on its slide by means of a set screw 37. Pin J' is similarly mounted on a carriage 38 (Fig. 21) longitudinally adjustable on a slide 39 which is not fastened to frame 12 until the time comes to make the adjustments because the setting of this slide constitutes one of the adjustments of pin J'.

To explain the action of the adjustments, let it be supposed that the instrument was designed for a lens of focus $f$ having its focal planes at F and F' Fig. 19 and requiring, according to my rules given above, the fixed mirror to be where shown in full lines at $N^3$, and the pin on frame 12 where marked in black at J'. If the lens to be used has a shorter focal length $f'$ with its focal planes at F'' and F''' mirror $N^3$ ought to be at N' closer to $M^3$ in the direction of line $N^3$ A and pin J' should be at J'''. J''' being the position of the pin, when frame 12 is in the dotted position, the pin should really be at $j$ on frame 12 in the full line position. But, neither the position of the pin nor that of the mirror $N^3$ can be thus certainly known until the exact errors of the lens to be used have been carefully determined, an operation which is rather troublesome and which I prefer to avoid by the following methodical use of the adjustments combined with direct focusing of the camera in the usual manner on a ground glass but with the aid of a magnifying lens and under conditions that are specially favorable. The observations should be made on three points in a manner similar to that indicated above in connection with Fig. 2 for placing scale Q'. These three points o', o'', o''' when observed must lie as shown in Fig. 22 in the line through $N^3$ and m' and should be, one, o', at a great distance or infinity, the second, o'', very close, and the third, o''', between the other two, preferably twice as far off as the closest so the ray from it to point A will about bisect the angle formed by the rays o'A, and o''A from the other two points.

Observations are first made on the distant point o' and the first move is to focus directly on the distant point o' by setting frame 12 in the dotted position where its ground glass must coincide with the focal plane F'' of the incorrect lens. Arm $D^6$ is then turned by hand on its pivot A' until the image in mirror $N^3$ registers then the arm is held and a point is run along the edges of the slot $g$ to scribe a line 40 Fig. 21, on frame 12, indicating the place and direction in which the slide 39 is to be fastened. (Only the ends of the line appear in the figure). Slide 39 has nicks 41 at its ends (Fig. 21) to register with the line 40 and insure a precise setting of the slide. This setting constitutes a partial adjustment of pin J', which now may be moved back and forth on its slide without budging mirror $M^3$ provided frame 12 remains clamped in its dotted position. In any other position of the frame where bar $D^6$ must necessarily make an angle with the slide 39, motion of the pin on its slide will of course move the mirror, but when the frame is brought back to its dotted position the mirror will become again parallel with mirror $N^3$ whatever may have been the displacements of pin J' on its slide in other positions of the frame; and, furthermore, as any shifting of mirror $N^3$ on its slide 34 does not destroy the parallelism of the mirrors, the correspondence between the sighting mechanism and the camera is secured for point o' in all possible positions of J' and $N^3$, and adjustment of pin J' and mirror $N^3$ on their respective slides now reduces itself to finding where pin J' should be fixed on its slide 39 and where mirror $N^3$ should be fixed on its slide 34 to secure the desired correspondence for the other two points o'' and o'''. Mirror $N^3$ is left clamped where it happens to be because the observer cannot yet know that it is not in the correct position; he next makes observations on the nearest point o'', that is, he draws back frame 12 and clamps it in focus on point $o''$ and noticing that the image in $N^3$ has shifted, he brings it back to match by adjusting pin $J'$ on its slide. Thus is secured exact correspondence for the second point. But such correspondence is possible for any position of mirror $N^3$ and the only way to know that the mirror is in proper position is to verify the device by observations on the intermediate point $o'''$. That is, by first focusing with the ground glass, and then noticing where the image stands in $N^3$. If the image does not register, the position of mirror $N^3$ must be changed and the whole process repeated beginning with the observations on points $o''$ (because change in the mirror will require a change in $J'$) until correspondence is secured between the inside refracted rays and the outside rays for $o'''$ as well as for the other two points. Correspondence between the camera and the sighting means being secured for the three points $o'$, $o''$ and $o'''$ it is certain that the instrument is correctly adjusted for all points. These operations are much more easily performed than described. An instrument adjusted by the above operation will give instantly and in the poorest conditions, where the observer could not possibly focus by the ordinary method, a focus as sharp and accurate as that which could have been got if the conditions were the very best, that is, as good as they were when the apparatus was being adjusted.

It is evident, that while the adjustments just described are primarily intended to allow for the probable error of the lens of given focus they may be extended enough to set the instrument for a lens of any desired focus, but the objection to such a wide range is, that an instrument of this type made suitable for the largest lenses would be needlessly cumbersome for use with the smallest. This objection does not apply with so much force to the type of instruments which are selfcontained, that is, that do not contain the camera as a link in their chain of mechanism.

I will now describe a principle which permits me to dispense with the auxiliary arm $D^6$, Fig. 19 or $D^5$, Fig. 18.

The forms that include mirrors may, so far as described, all be diagrammatically represented in Fig. 23, as comprising a lug $J'$ (not shown in the diagram) moving in a path HJ through spaces equal to image distances and acting obliquely on a pivoted indefinitely long straight arm $D^n$ the angular motions of which, reduced by one half, are transmitted to mirror $M^4$ through any suitable reducing gear such as the belt and pulleys shown in the diagram. It is evident that any other mechanism that will secure the same correspondence of image distances and mirror inclinations may be used. Thus, if it be found advantageous to reduce the motions of the driving pin—say by one-half, its path should be shifted to $H''$ (Fig. 23), where its motions will be one-half of what they were in path HJ for the same angular motions of arm $D^n$. Any other proportional or constant velocity ratio reduction or increase in the extent of the motion of the driving pin calls for a corresponding different shift in its path. A practical embodiment of such constant velocity ratio adjustment and shift in path is found above in Fig. 21, where pin $J'$ may be clamped in any desired position on slide 39. The contriving of other equivalents requires an intimate knowledge of the law connecting image distances with inclinations of the mirror. This law being substantially the same as the more obvious, though still intricate law, connecting image distances with inclinations of the auxiliary arm $D^n$, an exposition of the latter law will answer for the former. Considering the arm in any given position as at H in Fig. 24, it is seen that a small displacement $v$ of the driving point does not act in full on the arm but may be resolved into a displacement along arc $w$ acting with full effect at right angles to the arm, and one $u$ which is lengthwise of the arm or radial and which can have no effect whatever. This loss in efficiency due to the obliquity of the action may be made clearer by finding the point V of arm $D^n$ which describes an infinitely short arc $v$ that is equal to the corresponding infinitely small segment $v$ of path HJ that is simultaneously swept at H by the same arm $D^n$. Arc $v$ at V and the parallel arc $w$ at H are proportional to their radii, so that $$\frac{w}{v} = \frac{A'H}{A'V} \quad (5)$$

Now draw $HV'$, perpendicularly to $HA'$, to form the large rectangular triangle $V'A'H$, which is similar to the infinitely small triangle $uvw$, so as to have $$\frac{v}{w} = \frac{A'V'}{A'H} \quad (6)$$

This equation 6 and equation 5 multiplied together yield $$\frac{w.v}{v.w} = \frac{A'H.A'V'}{A'V.A'H}$$

or $$1 = \frac{A'V'}{A'V}$$

whence $$A'V = A'V'$$

That is to say, if the infinitely short horizontal path element $v$ swept at H, on the one hand, and the infinitely short arc element $v$ swept at V, on the other hand, are to be equal, we must make the radius $A'V$ equal to the distance $A'V'$, determined, on the vertical through A′, by drawing the perpendicular HV′ to the arm $D^n$.

Since displacement $v$ at H is produced by an angular rotation of $\frac{v}{A'V}$ radians, a displacement equal to $v$ divided by $\frac{v}{A'V}$ or equal to $\frac{v \cdot A'V}{v}$, that is to say, equal to A′V or A′V′, must be an exact representation of the velocity ratio at H. The velocity ratio at J is similarly represented on the vertical through A′ by a displacement A′V″, and as the drive point J′ (not shown in Fig. 24) moves from H toward J its velocity ratio gradually increases from the value represented by A′V′ to the more than twice larger value represented by A′V″. It is also evident in Fig. 24 that the ratio $\frac{A'V''}{A'V'}$ is equal to the square of the ratio $\frac{A'J}{A'H}$ or in symbols $$\frac{A'V''}{A'V'} = \frac{A'J}{A'H} \times \frac{A'J}{A'H} \quad (7)$$

Mirror inclinations and image distances therefore are far from being proportional to each other, and any mechanism used to secure exact correspondence of these two factors must involve a varying rate of transmitting motion or what Willis in his *Principles of Mechanism*, London, 1870, terms a "varying velocity-ratio". Any mechanism in which the rate of transmission is a varying rate may be suitable but certain mechanisms will of course be found more easily adaptable and better than others. Which is the best form will depend on the particular case and as this application is general in its nature I shall merely indicate in a general way what conditions should be filled by any mechanical equivalent. Whatever the form used, it is best, in all cases to first plot for the desired relation of the principal parts the form of Fig. 23, because this is the exact theoretical and complete solution showing at a glance the correspondence between arm inclinations and image distances and which can be made to cover any and all image distances by merely extending arm $D^n$ and path HJ.

Most equivalents being only approximate and hence limited, that is only practically equivalent for image distances less than a certain amount, the desired limiting or extreme positions A′H and A′J of arm $D^n$ should be drawn, and a diagram Fig. 24 made to determine the velocity ratios for the extreme positions. Care should then be taken that the variation in the velocity ratio shall be gradual from one extreme position to the other; that there be no sudden jumps or changes; and when a mechanism has been designed it is well to see how it answers for the middle position of the mirror. Any varying velocity ratio mechanism can, without regard to velocity ratios, first be proportioned to secure the proper image distances for the midway and the extreme positions of the mirror, and then can be slightly modified if necessary to secure the proper velocity-ratios; but as a general rule this three-point correspondence will be sufficient.

When the maximum image distance is relatively small; that is, not larger than in the hand cameras as they are now made, a constant velocity-ratio mechanism, or one that is nearly so, may be used provided its error be distributed; that is provided it be made to secure exact image distances for the extreme positions of the mirror. With a distributed error the error will be greatest for the midway position of the mirror as can be seen by comparison with the exact solution. Thus by the exact solution of Fig. 23, supposing the play of the mirror, from its parallel position 401 to its greatest inclination 403, is seven degrees, then that of arm $D^n$ will be twice seven or fourteen degrees, from position A′H to position A′J, and when the mirror is in its midway angular position 402, arm $D^n$ is angularly midway between its extreme positions, but meets the path HJ at a point $q$ closer to H than to J because in the triangle HJA′ the bisector of angle A′ must divide the base HJ proportionally to the other two sides. On the other hand a uniform rate mechanism, set to be exact for points H and J will not carry the mirror to its midway position until the drive pin has covered half the distance between H and J to $q'$. That is to say, if the drive pin J′ (not shown in Fig. 23) were connected with the mirror $M^4$ by "constant velocity ratio mechanism" calculated to make position H and position J of such drive pin exact for the corresponding extreme positions 401 and 403 of the mirror $M^4$, then this pin would have to travel from H toward J as far as the middle point $q'$ of path HJ to bring the mirror to its middle angular position 402, and in doing so the drive pin would have traveled too far by the distance $qq'$, which is an exact representation of the error in focus committed by such constant velocity ratio mechanism, for the drawing is made to scale.

Before leaving the question of equivalents I must describe a few special forms remarkable for their simplicity.

In Fig. 25 I have shown a form in which the lens frame 50 is the adjustable element of the camera proper. The mirrors $M^5$ and $N^5$ are mounted on this frame 50 and travel back and forth with it; but this does not change the principle of operation because the displacement of the lens and mirrors, equally displaces line A G without changing either its length or its inclination, such length and inclination being the only two factors upon which depends the law connecting image distances with mirror inclinations. Mirror M⁵ is provided with an arm 51 by which it is to be turned and the mechanism for turning it reduces itself to a plain link 52 pivoted to the camera frame at 53. This link 52 is preferably jointed at 54 and provided with a locking sleeve 55 by releasing which the link may be broken to permit of folding. With this mechanism the velocity ratio in the full line position is about three fifths of what it is in the dotted line position; that is for equal small angular displacements of the mirror the increase or decrease in image distances will be, in the full line position, about three-fifths of what it is in the dotted position.

The mechanism of Fig. 25 and many others may be much more easily changed at will in design, and adapted to suit special conditions by the addition of an auxiliary member geared with the mirror to revolve at any rate found to be desirable. Such auxiliary part corresponds to arm $D^n$ of my theoretical form and if made radial, it may be driven in the same manner directly by a drive pin provided its pivot be placed in the proper position. Thus in the diagram Fig. 26, which may be considered as an extension of diagram 23, let $M^4$ be the pivoted mirror, HJ the path of the drive pin which moves through image distances, and $A'$ the center of arm $D^n$ which is geared by belt and pulley with mirror $M^4$ to revolve just twice as fast. This is the theoretical form which is exact for all image distances; but let it be supposed that the greatest desired image distance is HJ. The extreme positions of arm $D^n$ are seen to form an angle of twenty degrees, which indicates an angular play of ten degrees for mirror M. In the midway position of the mirror, arm $D^n$ lies angularly midway between its extreme positions and meets path HJ at $q$ which, as before explained, divides HJ proportionally to the distances $A'H$ and $A'J$ from pivot $A'$ to the ends H and J of the path. The ratio in this case is that of 2 to 3.

Any other arm whose pivot is placed so its distances from H and J are in the same ratio, will when in its midway position pass through the same point $q$ and may be used in place of arm $D^n$ if it be so geared that sweeping from H to J it will turn the mirror through the required ten degrees. The arm $K'''$, for instance, pivoted at $A'''$ and geared with the mirror to revolve three times as fast is one equivalent form because its angular play is thirty degrees and the distances $A'''H$ and $A'''J$ are in the same ratio of 2 to 3. Arm $K'$ pivoted at $A''$ to revolve at the same rate as the mirror is for similar reasons a second equivalent form.

In the three forms there is exact correspondence of image distances for the midway and two extreme positions of the mirror and there is furthermore for all forms exactly the same relation between the velocity ratios at H and J, that at H being in each of the three cases, according to equation 7, above, exactly $\frac{3}{2} \times \frac{3}{2}$ or $\frac{9}{4}$ times greater than that at J. The velocity ratio when the drive point is at point $q$ differs slightly but not enough to be objectionable in most applications. On the whole the equivalence of the approximately accurate forms having pivots at $A''$ and $A'''$ to the theoretical form with pivot at $A'$ is remarkably close.

The different pivots that may be used, or the points in Fig. 26 that are 3/2 times farther from J than from H, are all found in the circumference of a circle 60 the center of which lies at the intersection 61 of the line through HJ with the line 62 perpendicular to the middle of bisector $A'q$.

Figure 27:
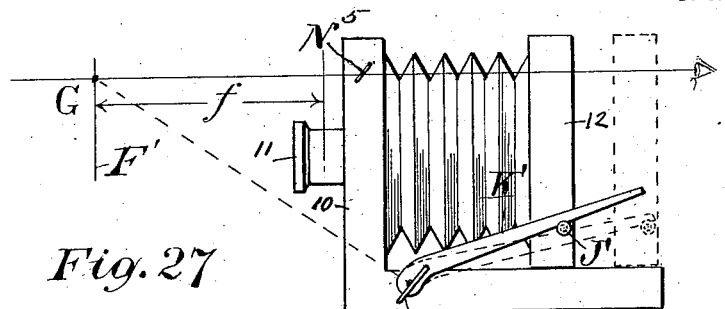

The form in which the arm revolves at the same rate as the mirror may be greatly simplified by selecting the path of the drive point in the same relative position with the pivot of mirror $M^4$ that it now has in the figure with pivot $A''$. Arm $K'$ may then be directly fixed to the mirror. Such an arrangement is shown in Fig. 27, where the arm $K'$ instead of being slotted, as I have so far shown similar arms, is made to bear by gravity against the guide pin. The great advantage of this form is its simplicity.

If the position of the drive pin as determined by the directions given above should fall where the pin cannot be supported, and it be necessary to set the drive pin in any particular place where the mirror arm cannot be radial, the arm may be bent as shown in Fig. 28. I have found that when the general arrangement is as shown the rubbing edge of the arm will in all cases be so nearly straight that there can be no object in making it curved as it should be in theory. This is a great advantage in practice because it permits of rapidly adjusting such a device by securing correspondence of mirror inclinations and image distances for only two object points, one of which should be distant and the other close. The camera is first sharply focused with the ground glass on the distant point, under specially favorable conditions; arm $K'$ is then set by hand and held so the image in mirror N will match, and while the mirror arm is so held a marking point is run along the lower cam edge of the arm to scribe a line on frame 12. The camera is next sharply focused on the close point and the mirror arm is set and held to secure matching for the close point. The marking point is again run along the lower cam edge of the arm to trace a second line which crosses the first at the place where the drive pin should be set. The upper rubbing surface of the pin should be tangent to the two lines thus traced on frame 12.

As it is often difficult to set the drive pin exactly in the place indicated it is better to set it a little high and then to correct the cam edge by filing. If the scribed lines do not cross on the plate frame 12 or at a place where the drive pin can be conveniently fastened the pin should be set on the plate frame a little above the higher of the two lines and the cam edge should then be suitably corrected by filing as before; that is, by making two of its points correct and then removing the intermediate material to join the correct points by a straight edge. Filing could be avoided by making the cam edge on a separate part adjustable with respect to the mirror arm, as in Fig. 57ª described later on in which the arm is of the same type as in Fig. 28.

When the cam edge is to be made adjustable it is preferable to use the arrangement of Fig. 29 in which the relations of cam and pin are reversed, the cam being in the shape of a plate 66 having slots 67 through which pass the screws 68 for clamping it firmly in adjusted position to the plate frame. The rounded end 69 of the mirror arm corresponds to the drive pin J' of the combination in Fig. 28. Between this rounded end 69, and the mirror M⁷ the arm may have any shape desired without affecting the law of motion. I have shown it curved to form on its upper edge a recess that permits the arm to go well in, out of the way, when the device is folded. A spring 70 fastened to the camera frame keeps the parts in working contact.

Figure 30:
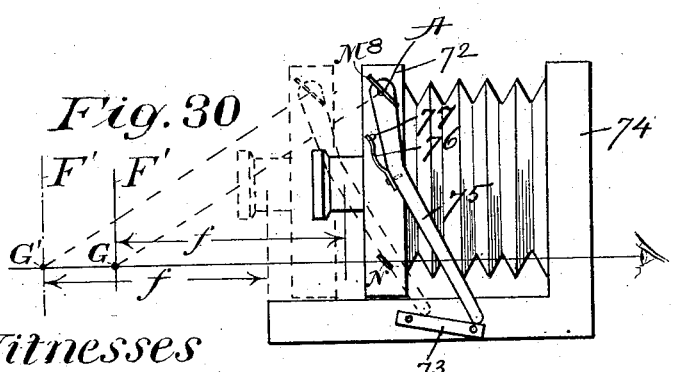

In the form of Fig. 30, the adjustable element of the camera proper is as in Fig. 25 the lens frame. The pivoted mirror M⁸ is above instead of below and the cam plate 73 is fastened on what is virtually an extension of the plate or film holding frame 74. The mirror arm 75 has fastened to it a spring 76 which bears against a pin 77 fixed on the lens frame 72. This spring acts to keep the arm and cam in working contact. When the instrument is folded the spring draws the mirror arm up against pin 77.

The forms of Figs. 27 to 30 just described are not fanciful modifications. They are all variable velocity ratio combinations drawn to scale for the focus shown and give an exact idea of the extent and nature of the different motions.

The form of Fig. 30 is seen to be substantially the same as that of Fig. 29 though its general arrangement is different. In both, mirror N and pivot A are in fixed relation to the lens frame and lens as in all the forms founded directly on my complete theoretical form. Changes such as made in passing from the form of Fig. 30 to that of Fig. 29 are therefore mere reversals; but there is a change which appears to only reverse and which does more. If the mirror N⁹, and pivot A are mounted in fixed relation to the plate or film holding frame, as I have shown them in the form of Fig. 31, the inclination and length of line A G will both vary with every change in the depth of the camera, and a more rapidly varying velocity ratio mechanism will be required than if mirror N and pivot A were fixed with respect to the lens and lens frame. All parts of Fig. 31 are substantially the same as those of Fig. 29. The two forms differ only as required by the transposition of lens and plate. That is, the mirrors are turned through a right angle and the cam plate 78 corresponding to cam plate 73 of Fig. 29 is set slanting the other way, and so as to secure the desired more rapidly varying velocity ratio.

All forms which like that of Fig. 31 have the mirrors fixed with respect to the plate holding frame may be operated by a constant velocity ratio mechanism under the same conditions that govern the use of such mechanism in the forms of the opposite type, that is, only when the desired maximum image distance is less than the focus and not too great a fraction thereof. The great advantage of a constant velocity ratio mechanism therefore is that it may be attached to any part of the camera that happens to suit best, and that it may, by a simple adjustment of its velocity ratio, be adapted within wide limits to any lens of whatever focus if the maximum image distance is not too great. These attributes of the constant velocity ratio arrangements make them specially valuable as attachments for the common hand cameras.

In Fig. 32 I show a form of hand camera that will answer for all. It is of the usual box type with a lens L adjustable to and from the plate or film 81 by means of a key 82. The motions of the lens are shown on the outside by a finger 83 which travels along a focusing scale. This scale must represent in actual size what I have called image distances; but it is graduated in feet or distances of the object from the camera and cannot be used except by actual measurement or estimation of the object distance. Now one of the principal objects of my invention is to do away with any such measurements or estimations. My device, whatever its form, depends simply on the inclination of rays that are so selected as to determine directly without any measurement whatever the image distances as represented in actual size on the focusing scale; and in order that this point be clearly understood I shall show how my device may be applied to work directly with the index finger 83. In Fig. 32, the device is of the simplest form without mirrors of the type shown in Fig. 3, but differing therefrom in that the mechanism, which is a plain bell crank 84 with links 85, 86 is very nearly a constant velocity ratio mechanism.

In Fig. 33 exactly the same camera is shown with the mirror form of attachment. The rate of transmission is of course halved because the arm 88' of the mirror moves only one-half as much as the pivoted sighting bar $D^8$ of Fig. 32. The angular motions of mirror $M^{10}$ and its arm 88' in this last form Fig. 33 are so small that pivot 88 of the mirror could be set back out of the way of the mirror. The virtual pivot of the mirror in such arrangements is at A, the crossing point of its extreme angular positions, and therefore point A is the one that I have made to correspond with the point A of Fig. 32. In order to more easily adjust the rate of transmission, one arm 87' of the bell crank 87 in Fig. 33 is made to be close to and about parallel with the mirror arm 88' and is provided with an adjustable contact lug 90 the adjustment of which held by clamp screw 90' acts doubly in that it lengthens the mirror arm as it shortens the crank arm, and vice versa. A spring 89 is provided to keep the parts in working contact. Link 86, 86' in this form is provided with a turn buckle 91 to complete the adjustability of the device. Any constant velocity ratio mechanism needs these two adjustments and no more. The one at 90 changes the velocity ratio and the other at 91 insures that the travel of the driven parts shall be within the desired limits. Thus, changing the length of link 86 does not change the rate of transmission, or the angle through which mirror $M^{10}$ is turned by motion of finger 83 from graduation 6 to graduation 100, but it does make the play of the mirror arm take place either lower or higher.

The camera of Fig. 33 and its mirrors must be regulated to secure exact correspondence for a distant object point and for a close object point, such as points o' and o'' of Fig. 22.

Correspondence for the distant point depends, mainly, on the length of the structural unit or link 86, 86'; and correspondence for the close point o'' depends, mainly, on the proportions of the bell crank or second adjustable structural unit 87, 90.

The camera box 80 is firmly fixed on a tripod and the camera is focused in the ordinary way by means of a ground glass, on the distant object point o'. If the said object point o' is at a distance of 100 feet this will place finger 83 opposite mark 100 of the focusing scale, as shown in Fig. 33. Now observe in and beside mirror $N^{10}$ the same sharply focused object point o'. This image of o' in $N^{10}$ will generally be offset, either too low, as in Fig. 7, or else too high, but it may be brought into the exact registration of Fig. 8 by turning the buckle 91. This either shortens or lengthens the link 86, 86' and rotates the pivoted mirror $M^{10}$. When registration is secured as in Fig. 8, mirror $M^{10}$ is nearly parallel to mirror $N^{10}$. The qualifier "nearly" is used to be logically exact because exact parallelism can only exist for an infinitely distant object point.

When the mirrors $M^{10}$, $N^{10}$ are parallel, or nearly so, the lever arm 88' of mirror $M^{10}$, and the horizontal arm 87' of bell crank 87, 87' are also substantially parallel, so that the contact lug 90 may be loosened at screw 90' and slid along on its arm 87' to change the velocity ratio without appreciably disturbing the inclination of mirror $M^{10}$. Correspondence has, therefore, been secured between the camera and the focusing mirrors for the object point o' at 100 feet, and substantially so, for all conceivable values of the velocity ratio.

Now set the camera in focus on the close object point o''. If this point o'' is 6 feet off, the finger 83 will come opposite mark 6 of the focusing scale. As finger 83 was thus moved from mark 100 to mark 6, the lever 87 was rotated counter-clockwise to impart an opposite or clockwise rotation to mirror $M^{10}$ and to its arm 88' so that such arm and the horizontal arm 87' of the bell crank are now set at a decided inclination to each other, and block 90 can no longer be shifted on its arm 87' without rotating mirror M.

As a rule, the image of the close object point o'' in mirror $N^{10}$ will be offset. It may be too low, as in Fig. 7, or else too high, and in either case it can be shifted to bring it into the proper registering position of Fig. 8, by shifting the contact lug 90 along on its crank arm 87', for this now rotates mirror $M^{10}$, as explained above. The contact lug 90 is, therefore, shifted until the position is found that secures exact registration of the image in $N^{10}$ for the close object point o'', and when such registration has been secured the lug 90 is firmly fastened to its crank arm 87' to constitute therewith and with arm 87 a second henceforth normally rigid structural unit 87, 87', 90, 90' of the combination. This last operation completes the regulation and adjustment of the camera, provided the arms 87' and 88' were exactly parallel when correspondence was secured for the distant object point o'. If they were not exactly parallel when set for the distant point o' the first adjustment of link 86, 86' has been slightly disturbed by the second adjustment and must be corrected. All correcting adjustments are made in the same way as the main adjustments, and they generally are too small to have, in the present combination, any appreciable disturbing effects of their own, so that the desired exact two-point correspondence is quickly secured.

*Mirrors.*—Having disposed of the general principles governing the connecting mechanism, I shall now explain the variations that may be made in the mirrors. These variations are specially useful in that they may be used with the different connecting mechanisms to greatly increase the number of possible forms and thereby facilitate the combining of the device with the different types of cameras to make combinations that will satisfy all the requirements of practice.

So far I have shown the fixed mirror N N' N², etc., as the peep mirror, but this was because I did not wish to confuse the question of mechanism with other questions that are in a sense independent because whatever the arrangement of the mirrors may be, the mirrors must be parallel when sighted on a very distant point, and where one of them is fixed must have the same mutual inclination when sighted on any given close point.

Figure 34:
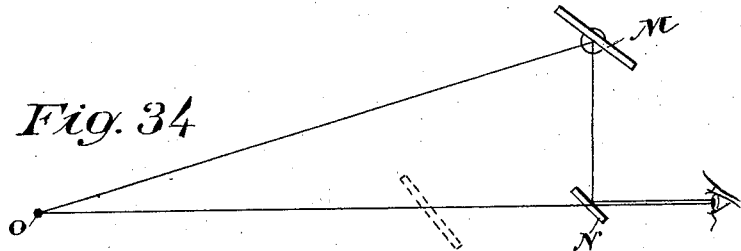

Fig. 34 is a diagram of the forms in which the fixed mirror N is the eye mirror or peep, and the pivoted mirror M the object mirror. The first variation is that of Fig. 35 in which the pivoted mirror M'' becomes the peep, and the fixed mirror N'' is now made larger and seen by reflection at N' and is provided with the bead mark $n$ reflected at $n'$. In this form the eye cannot remain fixed but must keep in line with the inclined ray, a feature which is not objectionable and which is useful in avoiding parallax as explained later on.

It is seen that the change from the one form to the other is made by turning each of the two mirrors through a right angle, but the variation may be got without any change in the arrangement of the mirrors and without displacing the eye, by simply making the peep mirror of Fig. 34 the pivoted mirror. This change illustrated in Fig. 36 produces a form which is clearly equivalent to that of Fig. 35 and which differs from the form of Fig. 34 only in that the pivot A is shifted from the one mirror to the other. The pivoted mirror in the different figures is the one provided with a small circle at its middle part.

In a form to be described later, in treating of parallax, both mirrors are pivoted. It appears, therefore, that either or both of the mirrors may be pivoted.

Figure 35:
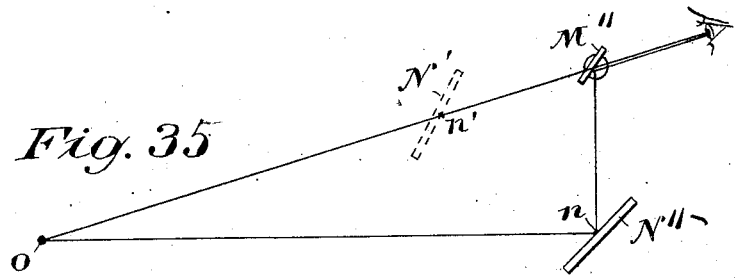
Figure 36:
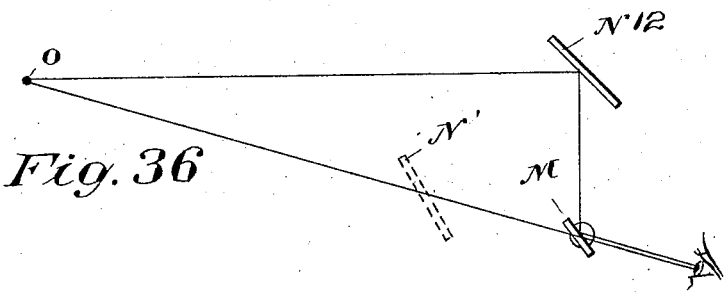

In the forms of Figs. 34 to 36, the mirror that acts as object mirror must be larger than the one that acts as eye mirror or peep, because it must supply rays to take the place of the direct rays that are obstructed by the peep, and must therefore be so large that its image will more than fill the peep for the observer's eye. This point is illustrated in Fig. 37, where 100 represents the peep mirror. The image 101' of the object mirror being only a virtual image, cannot obstruct any rays and may be as much larger than the limit 101'' as desired. Throughout this specification I use the sign M with a suitable index to indicate a pivoted mirror, and similarly the sign N for a fixed mirror; but I cannot well use either of these signs in this Fig. 37 and in certain others, where the question elucidated is independent of pivots and where, therefore, either or both of the mirrors may be pivoted.

Figure 38:
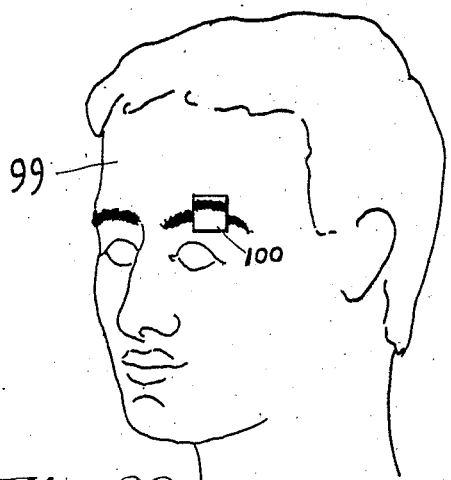

I make the peep mirror small as explained above to dispense with sights, and I prefer to support it in a manner to be explained under the head "Finders," by invisible; that is to say, transparent means, so the observer may see all around it and have two edges for matching the image with the directly visible part of the original. The effect of so supporting the peep is illustrated in Fig. 38, which represents what is seen by an operator who is sighting on a head 99 to be photographed. The operator sees directly all of the head except the part of the left eyebrow, which lies concealed behind the peep mirror 100. This concealed part is visible to him only by reflection from the mirrors, but appears to him as if visible directly through the peep and generally as if shifted from its true position. In the figure the shift is upward. By changing the mutual inclination of the mirrors so this image of the concealed part will register with the directly visible part, the image is made to apparently coincide with its original. The observer of course pays no attention whatever to the mirrors. All he sees is the object to be photographed with a part of it broken away and shifted out of place. He knows that by moving a certain key or lever he can set the fracture of the image and make all parts again continuous and complete, and that when the field is complete the camera is in focus on the point sighted and is thus focused automatically by the mere operation of sighting.

Figure 39:
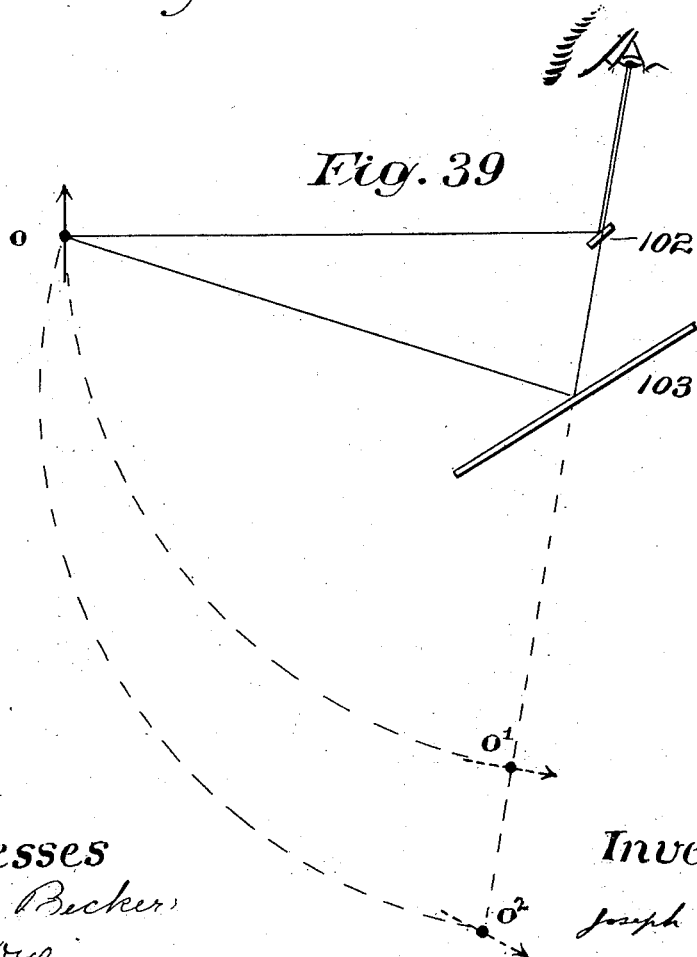

A variation that differs radically from the preceding is that of Fig. 39 in which neither of the rays to the eye is direct. Both rays are reflected, and each reflected but once to form two inverted images $o^1$ and $o^2$ of the objective point $o$. No part of the field being seen directly, the field is limited by the extent of the mirrors; and the part of the field that is visible in the farther mirror 103 is that which is not covered by the nearer mirror 102. The mirrors in this form show different but complementary parts of the field. Thus, in Fig. 40, where the field of the camera, in the direction of the image seen in the mirrors, is represented by a rectangle 105 to 108, I show a pair of single reflection mirrors 109 and 110, each covering for an eye at 111, one-half of the field. In such case the operation of sighting consists in registering one-half of the field with the other half, and as the mirrors are large they should both be provided with sight marks unless the correct position of the eye be insured by the addition of a fixed peep hole at 111, similar in function to peep 120 in Fig. 59 to be described.

If the whole field is desired, the farther mirror 103 in the form of Fig. 39 will have to be made very large, too large in some cases to be practical. To avoid this difficulty I have devised the form of Fig. 41 in which the near mirror 102$^a$ is made the field mirror and is provided with a perforation 104 at its center to receive rays from the distant mirror 103$^a$. In this arrangement the opening 104 corresponds to the peep of the forms shown in Figs. 34, 35 and 36 and its effect shown in Fig. 42 is exactly the same, save that the image seen is an inverted negative of the original. Compare Figs. 38 and 42.

In the forms of Figs. 39 to 41 as in the first forms of Figs. 34 to 36, either or both of the mirrors may be pivoted but the second forms have the advantage that no change in the mutual inclination of the mirrors can have any effect on the position of the eye.

In all the forms, reflecting prisms may be used in place of the mirrors. When the substitution is made in the forms of Figs. 34 to 36 the arrangement of the prisms for the three forms becomes substantially as shown in Fig. 43 where prism 100$^a$ is the peep mirror and prism 101$^a$ the object mirror. The substitution is as easily made in Fig. 39, transforming it into Fig. 44 where 102$^b$ and 103$^b$ are, respectively, the peep and object mirrors.

The form of Fig. 41 also can be easily converted into Fig. 45 by means of a perforated prism, 113, and the full prism 103$^c$, but the result is not satisfactory because of the difficulty of making a sharp flat-wall perforation and because the walls, unless they taper exactly to the observer's eye, must conceal the meeting edges of the images to be matched. Another and more serious objection is that the perforation acts as an opaque body in the prism and cuts off a good part of the image. To avoid all of these difficulties I have devised the improved form Fig. 46 in which a small prism 114 is cemented with Canada balsam to the under side of an unperforated main prism 115. The compound prism thus formed with prism 103$^d$ forms a combination exactly equivalent of the form shown in Fig. 41. The compound prism is shown in perspective in Fig. 47.

The addition of the small prism is equivalent in effect to the perforation of the large prism. It provides the large prism with a wall-less perforation. That a hole should be virtually produced by the addition of material is so paradoxical that I shall explain the effect in full. Where the prisms are in contact the cement unites them so intimately that the surfaces virtually cease to exist and the glass of the small prism 114 becomes in effect continuous with that of the large prism 115. The two prisms are, as it were, one solid mass of glass of the outline shown in Fig. 48, where the combination 114$^a$ 115$^a$ is obviously as transparent to a vertical ray of light 117 as any plate glass might be. The horizontal ray 118 also passes through without deviation. Ray 119 in Fig. 46 which in the drawing might appear to be reflected at the cemented surface of the small prism is really reflected by the adjacent uncemented surface of the large prism. If this ray could pass through it would pass beside the small prism. It may be well to recall that the two rays shown going into the eye in Figs. 34 to 36 and in the prism Figs. 43 to 46, are in different planes parallel to the paper. One may be considered in the plane of the paper and the other as before or behind it. A great advantage of the arrangement of Figs. 39 to 40 and 44 to 46 is that the vision is from the side and that the mirrors may be set within the camera framing where they cannot be damaged. In the other form of Figs. 34 to 36 and Fig. 43 the peep mirror must project at the moment of use unless some auxiliary means be used for deviating the rays of light.

When forty-five degree prisms are used, the line joining them should be as nearly perpendicular as practicable to the line of sight. This is because the reflecting surfaces when sighted on the same point each bisect one of the angles formed by the two main rays to the mirrors with the line joining the central points of the mirrors.

In theory the pivots of the mirrors should have their axes lying in the reflecting surfaces. In most cases, however, the angular motions of the mirrors are so small that the pivot need not be exactly in the reflecting plane and may be set where most convenient, as shown, for instance, at 88 in Fig. 33. In certain forms the departure from the true positions may be considerable, even when the angular motion is large; thus, as will appear later, the pivot may be intentionally set at a considerable distance from its mirror for the special purpose of avoiding parallax.

I have stated before that the registering of the images takes place only in the observer's eye and I wish to add here that however different the arrangement of mirrors may be it will be seen that the optical arrangement is in all cases combined to divide up the object to be photographed into two sections, which will register and make a continuous whole in the eye only when the apparatus is in focus on the said object. There may be more than two sections but two being sufficient and adequate there is no use in making more. Moreover the shape and distribution of these two sections in the field may vary considerably, as will be explained under the head of "Finders."

Fig. 49 shows an arrangement in which the eye mirror 100 and the object mirror 101 are so located as to require a pair of intermediate or auxiliary mirrors 120, 121.

Figure 51:
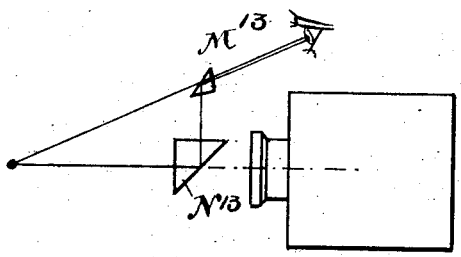
Figure 52:
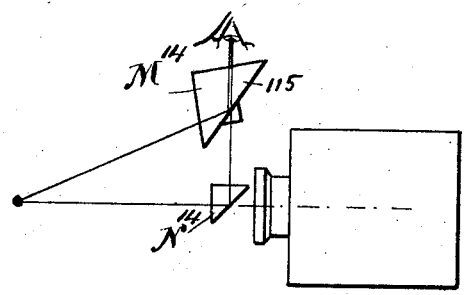

*Correction of parallax.*—The point sighted on, point $o$, Fig. 50, is in a line $o$ N through N, the fixed mirror, and parallel to the principal axis of the lens. It is therefore not the central point $C''$ of the field, but it is at a constant distance $h''$ from such center. Within the camera, however, the image of the point sighted is at a variable distance $h'''$ from the center of the picture. This variable distance $h'''$ is insignificant for distant objects and may generally be neglected, in fact a similar error is usually committed in most finders, but as my device is specially useful in photographing objects that are close and for which this error may be considerable, I have devised means for insuring that the image of the point sighted on shall fall exactly on the center of the plate or film. The distance from the point sighted on to the true center $C'''$ of the field being equal to the distance $h''$ of mirror N from the principal axis of the lens, the obvious way of curing the parallax error is to make this distance *nil*, that is, to select an arrangement of mirrors that will permit of setting the fixed mirror in the principal axis of the lens. Such arrangements are found in Figs. 35, 36, where the peep is the pivoted mirror, and may be applied as shown in Fig. 51. Any one of the forms of Figs. 39, 40, 41 and 43 to 46 may likewise be adapted to secure the same result by fixing the distant mirror and pivoting the nearer one. In Fig. 52, the mirrors are of the type shown in Fig. 46 with $M^{14}$ as the pivoted mirror and $N^{14}$ as the fixed mirror. The objection to these arrangements of Figs. 51 and 52 is that mirrors $N^{13}$ and $N^{14}$ must be mounted so it may be shifted aside at the moment of exposure, an operation which is not at all practicable in so called kinetoscopes or apparatus for making a series of exposures in rapid succession, and in which the camera depth must be varied during the exposure as the object approaches or recedes.

Figure 53:
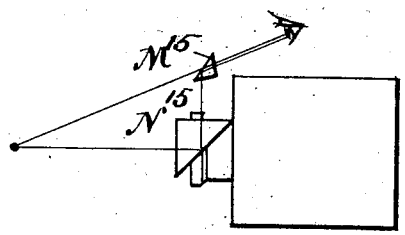
Figure 54:
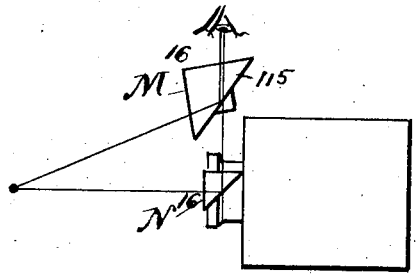

An approximate solution which is sufficiently accurate in most cases is to set the fixed mirror of the forms shown in Figs. 51 and 52 as close as possible beside the objective in the manner shown in Figs. 53 and 54. The true solution consists in setting the two mirrors on opposite sides of the lens axis in an axial plane and pivoting both mirrors so the rays of light to the two shall at all times be in an axial plane and equally inclined to the lens axis. Such an arrangement is shown for mirrors of the double reflection type (of Fig. 43) in side view Fig. 55 and in fore view Fig. 56. The mirrors which being both pivoted may be lettered $M^{17}$ and $M^{18}$, are mounted on a shelf 130 fastened to the lens frame 129 of the camera, and are provided with equal arms 131, 132, kept in contact by the tension of a spring 133, which also acts to keep the cam arm extension 134 in working contact with the upper edge of the plate frame 136, the mechanism being of the type shown in Fig. 28; this cam edge is substantially straight and may be made true enough in most cases by direct experimental determination of two of its points in the manner described for the form of Fig. 28, which will be again referred to under the title "Finders". The peep mirror is mounted directly on a finder, 145, of the divergent lens type.

In Fig. 57, I show diagrammatically a similar arrangement for mirrors of the single reflection type, but whose image is again reflected by an auxiliary mirror 138. This mirror erects the image, which would without it be inverted as that shown in Fig. 42, and also carries the rays in a convenient direction. The mechanism is substantially the same as in Fig. 55, that is to say the parts $129'$, $130'$, $131'$, $132'$, $133'$ and $134'$ of Fig. 57 correspond respectively to the parts 129, 130, 131, 132, 133 and 134 of Fig. 55 with the exception that the operating arm $134'$ is connected with the lower mirror so said arm will lie within the base of the camera. The field limiting means is a divergent lens $145'$ which is similar to the lens 145 of Fig. 55, and which will be again referred to under the head of Finders.

It should be noted, when the two mirrors are pivoted as in Figs. 55 and 57, that they each act as if coöperating with an imaginary fixed mirror set in the lens axis, and therefore the elements of arm $D^n$ of Fig. 23 in the theoretical forms of these combinations must be determined as if the other pivoted mirrors were not present.

Fig. 57$^a$ illustrates the type of Fig. 55 with the adjustable cam 250; and Fig. 57$^b$ shows the same type with the mechanism of Fig. 33. In Fig. 57$^a$ the parts $M^{27}$, $M^{28}$, 229 to 234, 236 and 245, are substantially the same as the obviously corresponding parts of Fig. 55, and need not be further described. The cam plate 250 is adjustably clamped to the arm 234 by screws 251, 252, in the same manner as plate 66 of Fig. 29.

In Fig. 57$^b$ the parts $M^{37}$, $M^{38}$, 329 to 334, 336 and 345 are also substantially the same as the obviously corresponding parts of Fig. 130

55, but the adjustable knife edge 335, bell crank lever 350, link 351 and nut 352 have the same functions and uses as the similar parts of Fig. 33.

A very simple arrangement for avoiding parallax not theoretically exact but almost so, is shown diagrammatically in Fig. 58. In this form mirror $N^{21}$ is fixed upon a bracket 152, but it is provided with an axial pivot 153 for the other mirror $M^{21}$. The arm 154, upon which mirror $M^{21}$ is mounted, is in the shape of a bell crank with cam extensions 155, similar in operation to that of Fig. 55.

*Finders.*—Almost any finder may be used in combination with any one of the different arrangements of mirrors shown. But my mirrors in the forms described, and especially when mounted to cure errors of parallax, are themselves in a sense finders, because they are used to sight and determine which shall be the central point of the picture. In the form of Figs. 39 to 41 and 44 to 46 they become true finders, when made of the proper size to show the whole field.

In Fig. 59, I show how by mere addition of a stationary peep 160 the form of Fig. 46 is converted into a complete focusing finder. As either or both of the mirrors, in this combination may be pivoted, I here designate them by numerals 161, 162, in accordance with the rule laid down above. The extent of field seen depends on the distance of the eye and the shape and size of the face 163 of the field prism. The face 163 should be of the proportions of the camera plate and may be made exactly so by screening. The peep should be at a distance where the cone of rays into the pupil will equal the cone admitted into the lens of the camera. The image thus seen is inverted as in Fig. 42 and as it may not be convenient to hold the eye close up against a peep, I can use instead (see Fig. 60) a small camera finder 170 of the usual type, but with its inside mirror removed because it is replaced by the outside prisms 171, 172. This combination yields an image of the same kind as that got in the common finder, that is, erect but turned right to left, and vice versa. In such a finding focuser the sighting mirrors are no more needed as sighting means but purely to show a mutilated field when the camera is out of focus and a continuous one when it is in focus. In this form, therefore, the peep need not be central nor small nor even single. Finders such as the one of Fig. 60, just described, in which the image is the real image received on a ground glass and seen by diffused or scattered light, therefore, differ somewhat in possibilities from the other class of finders shown in Figs. 55, 57, 57ª, 57ᵇ and 59 in which the rays of light are subjected to regular reflection or refraction at polished geometrical surfaces to form a final clear cut and bright aerial image which may be either real or virtual. The latter class of finders may, therefore, be referred to as "bright finders".

In Fig. 61, I show a field prism 180 with two rather large peeps 181, 182, which are convenient in focusing on an object which moves about in a constant field. The distant mirror in this case should be large enough to fill both peeps.

It is evident that if a point to be focused on is far from the center of the field and not covered by a break in the image, a slight shift may be made to focus and then another to bring the camera back before exposing. This, however, is an exceptional case.

When the mirrors are not needed for sighting, that is, when a finder does the sighting and the sighting of the mirrors is got indirectly by the act of matching the images, there is not in any of the forms any fixed rule as to the relative extent, shape or distribution of the two images which make up the field, except that the one image ought to show all of the field that does not appear in the other image.

In the focuser of the double reflection type (Figs. 43 and 34 to 36) the peep to be isolated in the the same manner as the peep in the form of Fig. 46 must be fixed to a transparent support which may be plain glass or as I prefer, a diverging lens finder, in the form shown in Fig. 55, where the finder is a plane concave lens 145 having a small prism $M^{18}$ cemented to its flat face. This is a very useful and simple form. The peep should be made rather large so the peep part of the field, which is reduced considerably by the lens, shall not be smaller than can be easily seen.

*Photographic focus.*—The advantages of a purely photographic focus are well understood by astronomers, as shown by the following quotation from the *"Principles of Physics"* of Alfred Daniell, London, McMillan & Co., 1884, page 485:

"Makers of photographic lenses have shown much skill in making the photographic and the visual focus coincide; for special photographic work, such as Rutherford's lunar photography, lenses have had to be constructed whose curvature is calculated with reference to the focus of the highly-refrangible actinic rays alone; and while nothing can be directly seen through such lenses, photographs of extraordinary clearness have been taken by their aid."

To this passage I will add that it is common knowledge that the simpler lenses and even the common non-achromatic meniscus lens occasionally yield pictures of remarkable clearness and that they necessarily do so when the object has its sharpest photographic image just where the plate happens to be.

Astronomers can use a photographic focus because their cameras are necessarily fixed focus cameras; but it is clear that in general photographic work the use of such a focus is purely accidental and not possible as a rule, because some means such as mine has not yet been devised that would permit of accurately focusing without the refracted rays, and that could be adjusted and varied as found necessary to adapt it to any focus whatever it may turn out to be.

The adjustment of my device for a photographic focus is done in the same manner as for the visual focus, except that instead of using a ground glass to focus and aim on any particular objects, I set the camera so its depth will evidently exceed its chemical focus and photograph a series of objects at different distances as is done in testing a lens for chemical focus, when this is sought as a defect. The object that comes out clearest is the one in focus for the given set of lens and plate and is the object that should yield a continuous image in the focuser attachment. Two observations of this kind suffice to give the apparatus its proper adjustment.

In the preamble of this specification I state that the practical device which comes nearest to mine is the duplicate or so-called twin camera. It is the device that most nearly accomplishes all that mine does. There is however a U. S. Patent No. 419,910 to Berthon, Jan. 21, 1890, which shows a focusing arrangement that might easily be thought to be similar in substance to that shown in my Fig. 3; and it is therefore necessary to distinguish the two devices. Both are telemetric in principle, although neither measures the distance of the object to be photographed. Berthon's involves a telemeter having its base in the object, and selects rays that converge from the ends of such base onto one point on the camera; mine involves a telemeter having its base on the camera and selects rays that diverge from one point in the object onto the ends of said base on the camera. This difference constitutes a difference in principle which enables me to focus on a point or detail without consideration of any dimension whatever, either in the object or on the camera; it has also led me to the direct scientifically exact and complete solution of the problem.

In view of the close resemblance between my devices and a sextant, it seems necessary to direct attention to the fact that in the theory of the sextant no regard is paid to the distance between the image and the object which is approximately equal to the distance between the mirrors, even in the position of apparent coincidence as explained above in connection with Fig. 10. The reason for this is that sextants are used on heavenly or other very distant objects, whereas my devices are mostly used on close objects and may have to be used on objects nearly as close as the outside focal plane (F', Fig. 4) of the camera. While the user of a sextant, therefore, may speak of a coinciding image or of coincidence, I am obliged to speak of apparent coincidence, and to provide for want of coincidence of the image actually produced by the apparatus, with the object; for, even when a finder is used producing two diminutive images, these, though very close, must also remain distinct and differ in position to correspond with the separated full size object and image, as seen in Fig. 10. Scientifically considered, therefore, my focusing camera comprises as principal elements, first, means for varying the inside distance between the nodal point of emergence of the objective and the geometrical surface adapted to contain the sensitized surface of the plate or film; second, means for producing an image of points lying in a line directed into the camera field, which line may be fixed as in Fig. 4 or movable as in Fig. 55; third, means to cause said images to move in paths passing through said line of sight (and all forms shown in this application some distance behind their corresponding original object points); fourth, mechanism for connecting the movable parts so that any point sighted on and brought into apparent coincidence with its image shall have its inside camera image formed in the said geometrical surface; fifth, means for defining the extent of the camera field surrounding said line of sight.

When the camera is provided with the usual focusing or distance scale seen in Figs. 32 and 33, also in Fig. 57$^b$, my device is not only telemetric in principle, as just stated, but it becomes, in fact, a range finder.

Note 1.—Equation 1, above, is substantially identical with equation 4 of my said Case K, where it assumes the form $PF.F'P'=f^2$ and is referred to as Newton's formula.

Note 2.—The specific invention involved in the theoretically exact focusing devices of Figs. 1 to 24 is completed and, therefore, claimed in my said Case Ae.

Note 3.—The form of Fig. 19 is not only theoretically exact, but it contains all adjustments that are necessary under the Gaussian theory of lenses to secure an exact 3-and-hence-all-point correspondence between the focusing means and the camera for a distant point, $o'$, a close point, $o''$, and an intermediate point, $o'''$. Exact correspondence for the intermediate point, $o'''$, however, depends upon an adjustment that is tentative, that is to say, if the adjustments are not carried sufficiently far the correspondence for the intermediate point, $o'''$, is only approximate, and the device then operates only as an approximately accurate focuser with exact 2-point correspondence for the distant point, $o'$, and for the close point, $o''$.

NOTE 4.—The most practical adjustable form herein disclosed and selected to support the claims is that of Fig. 33 or Fig. $57^b$, which secures only a 2-point correspondence, but such 2-point correspondence is secured by means of two adjustments that are substantially independent.

NOTE 5.—The scientifically exact solution of the problem involved in making the two adjustments absolutely independent is completely solved for mechanical focusers in my said Case Ab, and for optical focusers in my said Case Af.

NOTE 6.—In adjusting the Fig. 33 camera, for instance, to secure my herein specified "2-point correspondence," the value of the velocity ratio, in view of equation 1, is set, substantially, in proportion to the square of the focal length of the lens; but, as my said Cases Ab and Af disclose improved and theoretically exact embodiments of such "focus squared principle," the more specific claims thereon are made in my said Cases Ab and Af.

NOTE 7.—Where, as in Fig. 13, the eye mirror of a plain two-mirror focuser is arranged to face the object mirror the two mirrors coöperate to form a single image $O^2$ movable, as in Fig. 7, beside the stationary object O, and the focuser may be designated as a focuser of the "single image type." Such focusers of the single image type are seen in Figs. 4, 10, 12, 13, 18, 19, 23, 25, 27 to 31, 33 to 36, 43, 49, 51, 53, 58.

NOTE 8.—Where the eye mirror of a plain two-mirror focuser is arranged to face the object, as in Fig. 39, the mirrors independently form two separate relatively movable and simultaneously visible images $o'$, $o^2$ of the object point O, which is not seen directly; and the focuser may be designated as a focuser of the "two-image type." Such plain mirror focusers of the "two-image type" are seen in Figs. 39, 40, 41, 44, 45, 46, 52, 54, 59.

NOTE 9.—Any plain mirror focuser of the "single image type" listed in Note 7 becomes a focuser of the "two-image type" by interposing between the eye mirror and the eye in the path of the rays that proceed from the eye mirror an image forming device, such as the lens 145 in Figs. 55 and 56, the lens 145' and the mirror 138 in Fig. 57, the lens 245 in Fig. $57^a$, and the lens 345 in Fig. $57^b$, or the diminutive camera 170 in Fig. 60.

NOTE 10.—Where the two mirrors of a focuser are of the "two-image type," Fig. 39, and are provided with additional image forming devices, as in Fig. 57 or Fig 60, such image forming devices are arranged to produce secondary or tertiary duplicates of the two original images $o'$, $o^2$ of Fig. 39 so that the device remains a focuser of the "two-image type."

NOTE 11.—The triangle HA'J of Fig. 24 is always exactly equal to the corresponding triangle HAJ of Fig. 1, and as Fig. 24 contains no structural elements whatever it shows the exact correspondence that must exist in any type of two-sight optical focuser between focusing displacements as measured from H, such as HJ, and the ray inclinations as measured from HA', such as HA'J.

NOTE 12.—The lever form of focusing gear shown in Fig. 33 has one structural unit composed of elements 87 and 90 for the velocity ratio adjustment, and a second entirely different structural unit, to wit, link 86, 86' for the other adjustment, but the functions of both units may be united in a single structural unit as in the structural unit comprising cam 66 and the plate holding frame 66' in Fig. 29, or cam 250 and lever 234 in Fig. $57^a$.

NOTE 13.—Under the very special conditions of Fig. 3 in my said Case B, where the velocity ratio of the constant velocity ratio transmission 17, 18, 21 is not variable, the presence of a single normally rigid unit, such as link 22 to 25, having but one adjustable dimension, to wit: its length, is sufficient to permit of securing exact correspondence between the mirrors and the camera lens, for two different distances of the object point in the camera field.

NOTE 14.—"Depth of the camera" as used throughout this specification means the distance from the nodal point of emergence of the camera lens to the inside image receiving ground glass or sensitized surface.

What I claim as my invention and desire to secure by Letters Patent, is—

1. The combination with a focusing camera, of focusing means comprising means for sighting from different points situated in any desired relation to the camera on the same object point to be focused on; and connections between the said sighting means and the parts of the camera with adjustments in such connections to permit of securing exact two-point correspondence between the camera and such focusing means.

2. The combination with a focusing camera, of focusing means comprising means for simultaneously sighting from different points situated in any desired relation to the camera on the same object point to be focused on; and connections between the said sighting means and the parts of the camera with adjustments in such connections to permit of securing exact two-point correspondence between the camera and such focusing means.

3. The combination with a focusing camera of means for sighting from two points symmetrically disposed with respect to the lens axis on the same axial point to be focused on, and connections between the said sighting means and the parts of the camera so the sensitized surface in the camera shall contain the conjugate focus of the point sighted on.

4. The combination with a focusing camera of means for simultaneously sighting from two points situated in the same axial plane and symmetrically disposed with respect to the lens axis on the same axial point to be focused on, and connections between the said sighting means and the parts of the camera so the sensitized surface in the camera shall contain the conjugate focus of the point sighted on.

5. The combination with a focusing camera of means for sighting from different points of the camera on any one same point to be focused on, and connections between the said sighting means and the parts of the camera so the sensitized surface in the camera shall contain the conjugate focus of the point sighted on, and means for limiting the field of vision to make it correspond with the field of the camera.

6. The combination with a focusing camera of means for simultaneously sighting from different points of the camera on any one same point to be focused on, and connections between the said sighting means and the parts of the camera so the sensitized surface in the camera shall contain the conjugate focus of the point sighted on, and means for limiting the field of vision to make it correspond with the field of the camera.

7. The combination with a focusing camera of means for sighting from two points symmetrically disposed with respect to the lens axis on any one same point to be focused on, and connections between the said sighting means and the parts of the camera so the sensitized surface in the camera shall contain the conjugate focus of the point sighted on, and means for limiting the field of vision to make it correspond with the field of the camera.

8. The combination with a focusing camera of means for simultaneously sighting from two points symmetrically disposed with respect to the lens axis on any one same point to be focused on, and connections between the said sighting means and the parts of the camera so the sensitized surface in the camera shall contain the conjugate focus of the point sighted on, and means for limiting the field of vision to make it correspond with the field of the camera.

9. The combination of a range finder comprising two relatively pivoted mirrors, with the focusing mechanism of a camera, and a finder, such finder consisting in a divergent lens located in the direct line of sight between the eye mirror and the observer's eye, substantially as and for the purpose described.

10. The combination with a lens holding frame and a plate holding frame and an extensible light tight connection between them of means for simultaneously sighting from different points of the one frame and mechanism for connecting the said sighting means with the other frame in order that to each relative position of the two frames shall correspond a certain angular set of the sighting means, and means for limiting the field of vision to make it correspond with the field on the plate or film.

11. The combination with a focusing camera and its finder of means for making a part of the image in the finder movable with respect to the other parts of the finder image and mechanical connections between said means and the parts of the camera in order that the adjustments necessary to make the finder image complete and continuous shall automatically set the camera in focus on the object whose image has been so completed.

12. The combination with a camera of auxiliary focusing means mechanically connected therewith, and means for adjusting the velocity ratio of the said connecting mechanism.

13. The combination with a camera of auxiliary focusing means mechanically connected therewith, and means for adjusting the velocity ratio of the connecting mechanism, and other adjusting means for adjusting the connections between said mechanism and the connected parts.

14. The combination with a focusing camera and its finder of means for making in the finder two images movable with respect to each other, and mechanical connections between said means and the parts of the camera in order that the adjustments necessary to bring the two finder images into a certain relative position shall automatically set the camera in focus.

15. A photographic camera comprising a plate or film support and a lens support and adjusting means to vary the relative position of said supports for the purpose of focusing; of auxiliary focusing means comprising a part movably mounted on one of the said supports and mechanism connecting said other support with said movable part of the auxiliary focusing means; said mechanism comprising speed reducing gear and adjustments for the purpose set forth.

16. A photographic camera comprising a plate or film support and a lens support and adjusting means to vary the relative position of said supports for the purpose of focusing; of auxiliary focusing means comprising a mirror pivoted on one of the said camera supports, and mechanism connecting said other camera support with said pivoted mirror, said mechanism comprising: first, a lever having its fulcrum mounted on the said mirror carrying camera support at an invariable distance from and in fixed relative position to said mirror pivot, one arm of said lever being extended approximately parallel to the plane determined by the said mirror pivot and lever fulcrum, and its other arm being extended transversely of the camera; secondly, a link running longitudinally of the camera to connect the end of said transverse lever arm with the camera support on which the mirror is not mounted; and, thirdly, an arm rigidly connected with the pivoted mirror and also extended approximately parallel to the said plane of the mirror and lever pivots, said approximately parallel mirror arm and said first mentioned lever arm being adapted to engage in mechanical contact at a point lying approximately in the said plane of the mirror and lever pivots.

17. A photographic camera comprising a plate or film support and a lens support and adjusting means to vary the relative position of said supports for the purpose of focusing; of auxiliary focusing means comprising a mirror pivotally mounted on said lens support of the camera, and mechanism connecting said plate or film support of the camera with said pivoted mirror, said mechanism comprising: a lever having its fulcrum mounted on said lens support and one of its arms extended transversely of the camera, and a link running longitudinally of the camera to connect the end of said transverse lever arm with the said plate or film support.

18. A photographic camera comprising a plate or film support and a lens support and adjusting means to vary the relative position of said supports for the purpose of focusing; of auxiliary focusing means comprising a mirror pivotally mounted on said lens support of the camera, and mechanism connecting said plate or film support of the camera with said pivoted mirror, said mechanism comprising: a lever having its fulcrum mounted on said lens support with one arm directed approximately parallel with the line passing through the mirror pivot and the said fulcrum and its other arm extended transversely of the camera; a link running longitudinally of the camera to connect the end of said transverse lever arm with the said plate or film support; an arm rigidly connected with the said pivoted mirror and also directed approximately parallel with said first mentioned lever arm, said approximately parallel mirror and lever arms being adapted to engage and make contact at a point situated approximately on the said line passing through the mirror pivot and the said fulcrum.

19. A photographic camera comprising a plate or film support and a lens support and adjusting means to vary the relative position of said supports for the purpose of focusing; of auxiliary focusing means comprising a mirror pivotally mounted on said lens support of the camera, and mechanism connecting said plate or film support of the camera with said pivoted mirror, said mechanism comprising: a lever having its fulcrum mounted on said lens support with one arm directed approximately parallel with the line passing through the mirror pivot and said fulcrum and its other arm extending transversely of the camera; a link running longitudinally of the camera to connect the end of said transverse lever arm with the said plate or film support; an arm rigidly connected with the said pivoted mirror and also directed approximately parallel with said first mentioned lever arm, said approximately parallel mirror and lever arms being adapted to engage and make contact at a point situated approximately on the said line passing through the mirror pivot and the said fulcrum, and means for adjusting the position of said point of contact to vary the velocity ratio of the connecting mechanism.

20. A photographic camera comprising a plate or film support and a lens support and adjusting means to vary the relative position of said supports for the purpose of focusing; of auxiliary focusing means comprising a mirror pivotally mounted on said lens support of the camera, and mechanism connecting said plate or film support of the camera with said pivoted mirror, said mechanism comprising: a lever having its fulcrum mounted on said lens support with one arm directed approximately parallel with the line passing through the mirror pivot and the said fulcrum and its other arm extended transversely of the camera; a link running longitudinally of the camera to connect the end of said transverse lever arm with the said plate or film support; an arm rigidly connected with the said pivoted mirror and also directed approximately parallel with said first mentioned lever arm, said approximately parallel mirror and lever arms being adapted to engage and make contact at a point situated approximately on the said line passing through the mirror pivot and the said fulcrum, means for adjusting the position of said point of contact to vary the extent of motion transmitted to the mirror, and means for adjusting the length of said longitudinal connecting link to vary the correspondence of mirror positions with the positions of the plate or film support.

21. A photographic camera comprising a plate or film support and a lens support and adjusting means to vary the relative position of said supports for the purpose of focusing; of auxiliary focusing means comprising a mirror pivoted on one of the said camera supports, and mechanism connecting said other camera support with said pivoted mirror, said mechanism comprising: first, a lever having its fulcrum mounted on the said mirror carrying camera support at an invariable distance from and in fixed relative position to said mirror pivot, one arm of said lever being extended approximately parallel to the plane determined by the said mirror pivot and lever fulcrum, and its other arm being extended transversely of the camera; secondly, a link running longitudinally of the camera to contact the end of said transverse lever arm with the camera support on which the mirror is not mounted; and, thirdly, an arm rigidly connected with the pivoted mirror and also extended approximately parallel to the said plane of the mirror and lever pivots, said approximately parallel mirror arm and said first mentioned lever arm being adapted to engage in mechanical contact at a point lying approximately in the said plane of the mirror and lever pivots, and a spring acting on said mirror arm to keep the parts in working contact.

22. The combination with a photographic camera and an external arrangement to permit of focusing the camera by means of rays of light that have no part in the formation of the camera image, and that proceed from a point in the camera field to at least two different points on the camera, of two independent adjustments to permit of securing exact correspondence of action of the said focusing arrangement with the camera for two different object points situated at different distances from the camera.

23. The combination with a photographic camera comprising movable parts adapted to be moved to set the camera in focus on an object in the camera field; of an auxiliary optical arrangement or focuser, for said camera, comprising relatively movable parts that are adapted to be moved to occupy a relative position dependent upon the distance of the same said object in the camera field; structural connections between said relatively movable focuser parts on the one hand, and the said relatively movable camera parts on the other hand, to insure that to each relative position of the said camera parts shall correspond only one relative position of the said focuser parts; said structural connections comprising normally rigid units, each composed of elements whose relative position may be changed to secure the effective dimension of such unit that is required with the particular camera objective used; said adjustable units being present in such number and arrangement as to permit of securing exact correspondence between the said focuser and camera for at least two different distances of the said object in the camera field.

24. The combination with a photographic camera comprising relatively movable parts adapted to be relatively moved to set the camera in focus on an object point of the camera field; of an auxiliary optical focuser, for said camera, comprising means for sighting convergingly from two laterally separated points of such focuser at the same said object point of the camera field; said focuser comprising also relatively movable parts that are adapted to be moved to change the relative inclination of the said sighting directions; structural connections between the said relatively movable focuser parts on the one hand, and the said relatively movable camera parts on the other hand, to insure that to each relative position of the said camera parts shall correspond only one relative inclination of the said sighting directions; said structural connections comprising a normally rigid unit composed of elements whose relative position may be changed to permit of changing the correspondence that exists between the focusing displacements in the said camera and the sighting inclinations in the said focuser as required to suit the particular camera lens used.

25. The combination with a camera comprising relatively movable parts the relative motions of which are adapted to cause the conjugate focus of an object in the camera field to move through the image receiving surface of the camera; of an image forming instrument mechanically connected with said camera parts, and adapted to receive different groups of rays from the said object to form simultaneously visible images the apparent positional relation of which is changed by moving the said relatively movable camera parts, and also by changing the distance of the said object from the camera.

26. The combination with a camera comprising relatively movable parts the relative motions of which are adapted to cause the conjugate focus of an object in the camera field to move through the image receiving surface of the camera; of an image forming instrument adapted to receive different groups of rays from the said object to form simultaneously visible images the apparent positional relation of which is changed by changing the distance of the said object; and connections between said means and the camera also adapted to change the apparent relative position of said images by relatively moving the said camera parts.

27. The combination with a camera comprising relatively movable parts the relative motions of which are adapted to cause the conjugate focus of an object in the camera field to move through the image receiving surface of the camera; of an image forming instrument mechanically connected with the said camera parts and adapted to receive different groups of rays from the said object to form simultaneously visible images the apparent positional relation of which is changed by changing the distance of the said conjugate focus to the said image receiving surface of the camera.

28. The combination with a camera adjustable in depth, of an auxiliary optical arrangement for forming two separate images with different groups of rays from an object in the camera field, the elements of said optical arrangement being relatively movable to cause the two simultaneously visible images formed thereby to be relatively movable, and connections between the said optical elements and the camera elements, said connections being adapted to hold the elements of the optical arrangement in relative positions dependent upon the depth of the camera.

29. The combination with a camera adjustable in depth, of an optical arrangement for forming simultaneously visible complementary images of an object in the camera field, the elements of said optical arrangement being relatively movable to cause the said complementary images to appear to be relatively movable through the position of apparent registration, and connections between the said optical elements and the camera elements, said connections being adapted to hold the said optical elements in relative positions dependent upon the depth of the camera.

30. The combination with a camera adjustable in depth, of means connected therewith for instrumentally forming, externally of the camera, two simultaneously visible and relatively movable images of an object to be photographed, the positional relation of which images is simultaneously dependent upon the depth of the camera and the distance of the said object.

31. The combination with a camera adjustable in depth, of means structurally connected therewith and so constructed as to instrumentally form, externally of the camera, two simultaneously visible and relatively movable images of an object to be photographed, and further so constructed as to present the said images with their apparent relative positions simultaneously dependent upon the depth of the camera and the distance of said object.

32. The combination with a camera having an adjustment to permit of setting the camera in focus on an object to be photographed, of an arrangement structurally connected therewith for indicating the focal relation of the camera on such object, said arrangement comprising means adapted to receive rays from such object to instrumentally form two simultaneously and relatively movable images the apparent positional relation of which is simultaneously dependent upon the depth of the camera and the distance of the said object.

33. The combination with a camera adjustable in depth, of an auxiliary optical arrangement for instrumentally forming with rays from an object in the camera field two simultaneously visible and relatively movable images the positional relation of which is jointly dependent upon the distance of the object, and the relative position of the elements of the optical arrangement, and connections between said optical elements and the camera elements, such connections being adapted to hold the said optical elements in relative position dependent upon the depth of the camera.

34. The combination with a photographic camera having relatively movable parts for varying the optical depth of the camera, or optical distance between the image receiving surface of the camera and the nodal point of emergence of the objective, as may be necessary to set the camera in focus on an object point in the camera field; of additional relatively movable optical elements supported on the camera to receive distinct rays of light from the same said object point and transmit such rays in a directional relation which shall vary with variations in the relative position of the said additional optical elements; the latter being mechanically connected with the said relatively movable parts of the camera so that the said transmitted rays shall proceed from two images of the said object point situated in a certain focus-indicating relation when the camera is in focus on the said object point, and situated in a different relation when the camera is not in focus on the said object point.

35. The combination with a photographic camera having relatively movable parts for varying the optical depth of the camera, or optical distance between the image receiving surface of the camera and the nodal point of emergence of the objective, as may be necessary to set the camera in focus on an object point in the camera field; of additional relatively movable optical elements supported on the camera to receive distinct rays of light from the same said object point and transmit such rays in a directional relation which shall vary with variations in the relative position of the said additional optical elements; the latter being mechanically connected with the said relatively movable parts of the camera so as to transmit the said distinct rays as proceeding from two images of the said object point situated in substantially the same direction from the finder when the camera is in focus on the said object point, and situated in different directions from the finder when the camera is out of focus on the said object point.

36. The combination with a photographic camera having relatively movable parts for varying the optical depth of the camera, or optical distance between the image receiving surface of the camera and the nodal point of emergence of the objective, as may be necessary to set the camera in focus on an object point in the camera field; of a finder supported on the camera for substantially defining the limits of the said camera field; said finder comprising relatively movable optical elements adapted to receive distinct rays of light from the same said object point and transmit such rays in a directional relation which shall vary with variations in the relative position of the said relatively movable finder elements; the latter being mechanically connected with the said relatively movable parts of the camera proper so that to every given optical depth of the camera shall correspond one certain relative position of the said relatively movable finder elements.

37. The combination with a photographic camera having relatively movable parts for varying the optical depth of the camera, or optical distance between the image receiving surface of the camera and the nodal point of emergence of the objective, as may be necessary to set the camera in focus on an object point in the camera field; of a finder supported on the camera for substantially defining the limits of the said camera field; said finder comprising relatively movable optical elements adapted to receive distinct rays of light from the same said object point and transmit such rays in a directional relation which shall vary with variations in the relative position of the said relatively movable finder elements; the latter being mechanically connected with the said relatively movable parts of the camera proper so that the said transmitted rays shall proceed from two images of the said object point situated in a certain focus-indicating relation when the camera is in focus on the same said object point, and situated in a different relation when the camera is not in focus on the said object point.

38. The combination with a photographic camera having relatively movable parts for varying the optical depth of the camera, or optical distance between the image receiving surface of the camera and the nodal point of emergence of the objective, as may be necessary to set the camera in focus on an object point in the camera field; of a finder supported on the camera for substantially defining the limits of the said camera field; said finder comprising relatively movable optical elements adapted to receive distinct rays of light from the same said object point and transmit such rays in a directional relation which shall vary with variations in the relative position of the said relatively movable finder elements; the latter being mechanically connected with the said relatively movable parts of the camera proper to transmit the said distinct rays as proceeding from two images of the said object point situated in substantially the same direction from the finder when the camera is in focus on the said object point, and situated in different directions from the finder when the camera is out of focus on the said object point.

39. The combination with a focusing camera and its finder, of means for automatically indicating in the finder image when and in which direction the original of said image is not in focus within the camera.

40. The combination with a focusing camera and its finder, of means for forming in the finder two images of an object aimed at, and mechanism between such means and the camera whereby the relative position of the two images shall indicate the direction and extent of adjustment needed between the lens and plate of the camera to set the camera in focus on such object.

41. As an attachment for cameras, the combination with a lens, of a reflecting prism cemented thereon, and a second reflector coöperating with the lens and prism to form duplicate images of an object viewed in the lens.

42. As an attachment for cameras, the combination with a divergent lens, of a reflecting prism cemented thereon, and a second reflector, coöperating with the lens and prism, to form duplicate images of an object viewed in the lens.

43. As an attachment for cameras, the combination with a lens of a reflecting prism cemented thereon and a second reflector pivoted to coöperate with the lens and prism in forming two relatively movable images of an object.

44. The combination with a camera and its finder, of automatic means for mutilating the finder image when the camera image is out of focus.

JOSEPH BECKER.

Witnesses:
Louise Dixon,
Camille Becker.

Copies of this patent may be obtained for five cents each, by addressing the "Commissioner of Patents, Washington, D. C."